United States Patent [19]
Mahant-Shetti et al.

[11] Patent Number: 5,751,987
[45] Date of Patent: May 12, 1998

[54] DISTRIBUTED PROCESSING MEMORY CHIP WITH EMBEDDED LOGIC HAVING BOTH DATA MEMORY AND BROADCAST MEMORY

[75] Inventors: Shivaling S. Mahant-Shetti, Richardson; Derek J. Smith, Dallas; Basavaraj L. Pawate, Dallas; George R. Doddington, Dallas; Warren L. Bean, Wylie; Mark G. Harward; Thomas J. Aton, both of Dallas, all of Tex.

[73] Assignee: Texas Instruments Incorporated, Dallas, Tex.

[21] Appl. No.: 434,885

[22] Filed: May 4, 1995

Related U.S. Application Data

[63] Continuation of Ser. No. 129,012, Sep. 30, 1993, abandoned, which is a continuation of Ser. No. 498,235, Mar. 16, 1990, abandoned.

[51] Int. Cl.[6] .................................................... G06F 12/00
[52] U.S. Cl. .................... 395/405; 395/431; 365/230.04
[58] Field of Search .................. 395/425 MS, 431, 395/405; 365/230.05, 189.04, 189.08, 230.03, 238.5, 230.04

[56] References Cited

U.S. PATENT DOCUMENTS

| | | | |
|---|---|---|---|
| 4,122,519 | 10/1978 | Bielawski et al. | 364/200 |
| 4,761,733 | 8/1988 | McCrocklin et al. | 364/200 |
| 4,783,732 | 11/1988 | Morton | 365/230.05 |
| 4,809,169 | 2/1989 | Sfarti et al. | 364/200 |
| 4,896,265 | 1/1990 | Fiduccia et al. | 364/200 |
| 4,908,795 | 3/1990 | Tsuchiya et al. | 365/230.05 |
| 4,920,482 | 4/1990 | Hasebe et al. | 364/200 |
| 4,980,850 | 12/1990 | Morgan | 395/425 |
| 5,031,139 | 7/1991 | Sinclair | 364/DIG. 2 |
| 5,063,521 | 11/1991 | Peterson et al. | 395/27 |
| 5,081,573 | 1/1992 | Hall et al. | 395/800 |
| 5,081,575 | 1/1992 | Hiller et al. | 395/325 |
| 5,113,507 | 5/1992 | Jaeckel | 395/425 |
| 5,129,077 | 7/1992 | Hillis | 395/500 |
| 5,136,691 | 8/1992 | Baror | 364/200 |
| 5,230,079 | 7/1993 | Grondalski | 395/800 |

FOREIGN PATENT DOCUMENTS

| | | |
|---|---|---|
| 0136218 | 4/1985 | European Pat. Off. . |
| 8801769 | 3/1988 | WIPO . |
| 8906014 | 6/1989 | WIPO . |
| 9000287 | 1/1990 | WIPO . |

OTHER PUBLICATIONS

"A Routing Model for the NCR GAPP", Jacqueline Signorini, 1988, IEEE, pp. 517–521.

"Mesh–Connected Array Processors with By Pass Capability for Signal/Image Processing", 1988, Kim et al., IEEE, pp. 203–210.

R. Johnson, "'Smart' RAM Pulls Vector Duty", Electronic Engineering Times, Apr. 25, 1988, p. 48.

B. Cushman, "Matrix Crunching With Massive Parrallelism", VLSI Systems Design, Dec. 1988, pp. 19–19, 22, 26–28, 30 and 32.

S. Morton, "Intelligent Memory Chip Competes With Optical Computing", Laser Focus World, Apr. 1989, pp. 163–164.

*Primary Examiner*—David L. Robertson
*Attorney, Agent, or Firm*—Jacqueline J. Garner; W. James Brady, III; Richard L. Donaldson

[57] ABSTRACT

Memory chips with data memory (202), embedded logic (206) and broadcast memory (204) for two modes of operation are disclosed. A first mode of operation is the usual memory mode expected of a data RAM. The second mode of operation allows localized computation and/or processing of the data in data memory (202) by the embedded logic (206) with minimal handshaking with a remote CPU. In a functioning system, the memory chips are organized in a hierarchical manner and include address-associative memory systems.

12 Claims, 18 Drawing Sheets

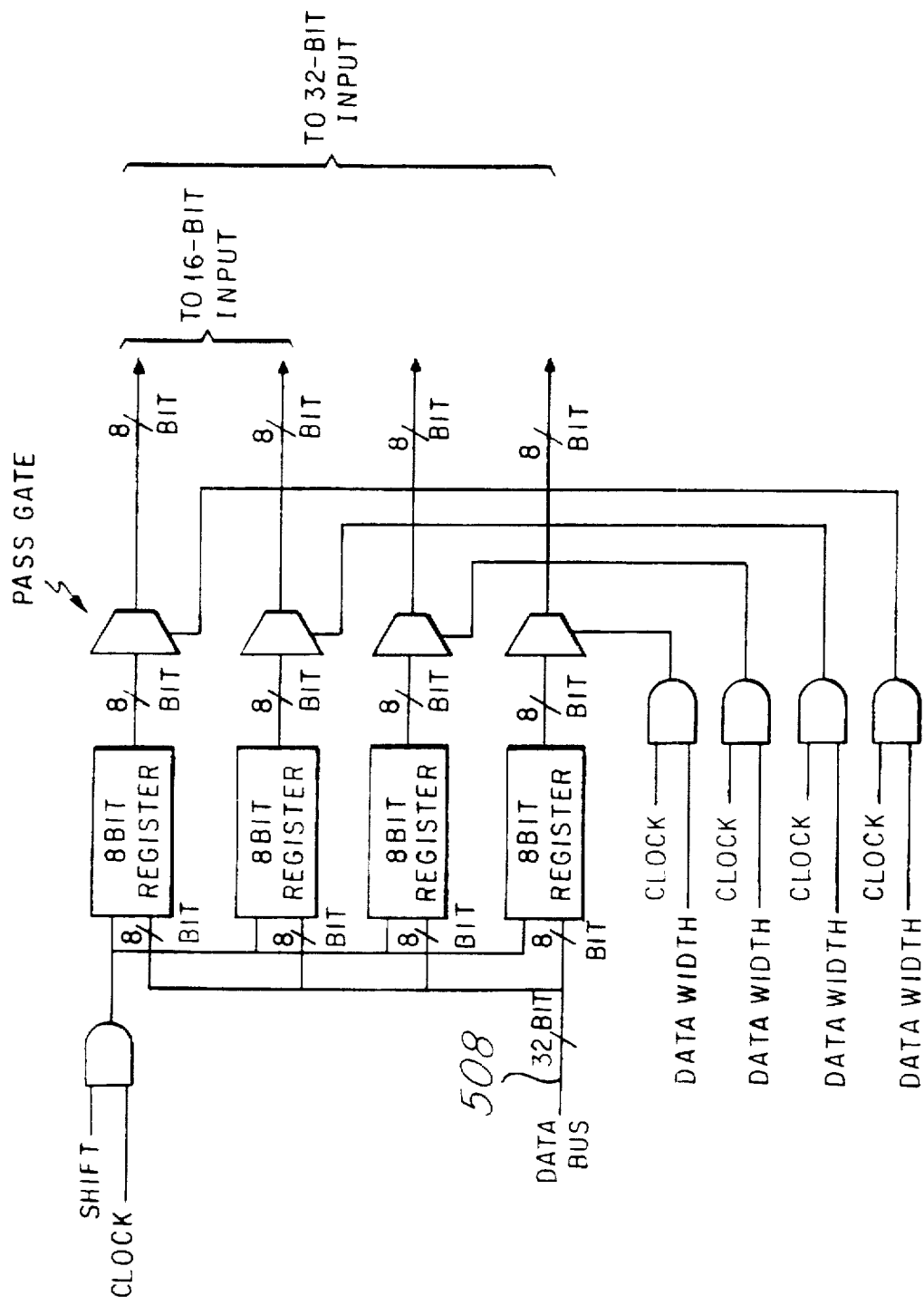

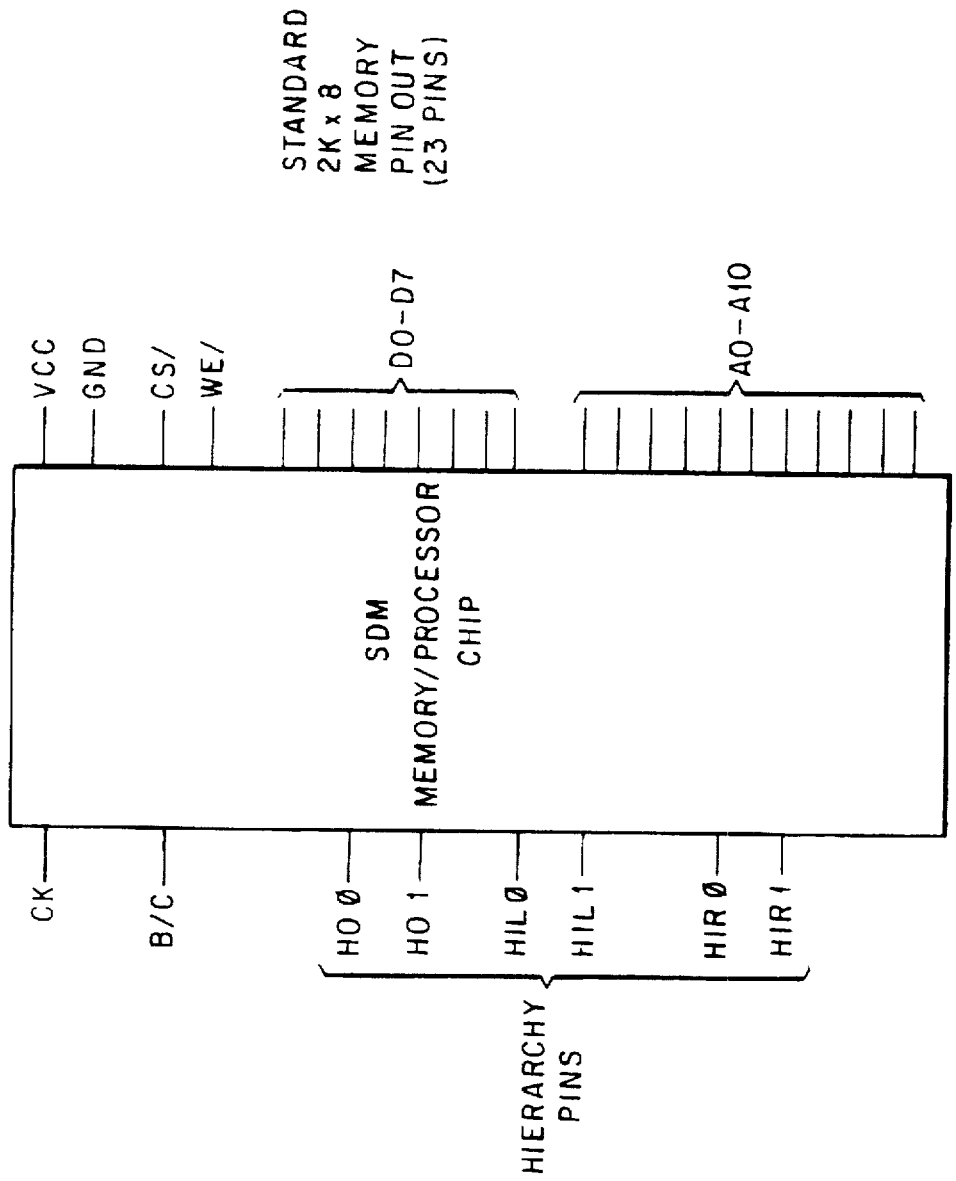

DISTRIBUTED PROCESSING MEMORY CHIP WITH EMBEDDED LOGIC HAVING BOTH DATA MEMORY AND BROADCAST MEMORY

This application is a continuation of application Ser. No. 08/129,012, filed Sep. 30, 1993 now abandoned; which is a continuation of Ser. No. 07/498,235, filed on Mar. 16, 1990 now abandoned.

CROSS-REFERENCE TO RELATED APPLICATIONS

Copending U.S. application Serial No. 10,619, filed Feb. 4, 1987 (Frazier), discloses related subject matter and is assigned to the assignee of this application.

BACKGROUND OF THE INVENTION

1. Field of the Invention. The present invention relates generally to distributed processing and more particularly to integrated memory plus logic and systems for such integrated memory plus logic.

2. Description of the Related Art.

A typical von Neumann computer system consists of a central processor unit (CPU) and a number of memory chips. The addition of multiple processors to increase processing power by parallel processing is a difficult task while the addition of memories for a single processor is relatively trivial. This is because processors need frequent access to the system bus and the presence of several in a system requires bus access arbitration. The inability to provide adequate input/output (I/O) bus bandwidth from memory to each processor leads to the inability to effectively use all available CPU cycles. Thus, present parallel processing systems are termed bus or I/O limited which require expensive CPU-to-memory bandwidth and additional costly processors to increase system throughput.

Between the continuum of a single processor system with a dedicated memory and the systolic approach of having computation hardware for every bit of data, the ratio of computation to memory size can be continuously varied. A design may possess great computation capability as measured in millions of operations per second (MIPS) but all potential MIPS are not usable due to the cycles lost as the processors wait for data. The system performance is governed by the overall bandwidth of the system. The system bandwidth can be defined as the product of number of busses and the frequency of toggling. A system performance cost function can then be the electric power expended:

$$Cost = Bandwidth \times Capacitance \times (VoltageSwing)^2$$

For a given system MIPS and system bandwidth, this cost function can be minimized by reducing the bus capacitance and/or the bus signal swing. Traditional approaches of getting improvement in system bandwidth include faster gate speed, higher chip complexity, and higher pin count. These methods achieve incremental success at a much higher cost in monetary terms as well as in terms of the electrical cost function due to the more expensive integrated circuit (IC) fabrication technology and/or increased packaging cost.

Researchers in the field of parallel processing are struggling to overcome the difficulties inherent with general purpose parallel hardware and software. In general, the segmentation of problems into similar sized blocks that can efficiently utilize the hundreds-thousands of available processing elements of a massive parallel processing machine is proving to be very challenging. The near term trend for commercial systems is clearly for application specific systems designed to solve readily segmented problems.

As computer system size grows, mismatch occurs between computation power and memory size. Several computational tasks such as digital signal processing require computational cycles proportional to system size, and bus traffic between memory and a central processor limits processing speed. A solution based on distributing computation capability to memories has been known for many years, but has been largely ignored because of the non-von Neumann computer architecture involved. A recent version of this smart memory as developed by Oxford Computers is described in Cushman, Matrix Crunching with Massive Parallelism, VLSI Systems Design pp. 18–32 (Dec. 1988) and Morton, Intelligent Memory Chip Competes with Optical Computing, Laser Focus World pp. 163–164 (Apr. 1989). However, this smart memory has limitations including only serial writing from the central processor to the individual memory chips and severe constraints on logic complexity.

SUMMARY OF THE INVENTION

The present invention provides computer memory chips which include internal computational logic and secondary memory that may be broadcast to in all chips simultaneously and systems with such memories. The memory chips may have a standard package pin configuration. The architecture allows easy expansion of the number of parallel Processing Elements by simply increasing the number of chips and permits massively parallel processing. The chips may also operate as conventional RAMs. (Random Access Memories).

This solves known system problems by minimizing the need for board level data movement. The chips achieve this by combining storage with computation and reducing the amount of data sent to the main CPU.

A first order estimate of system throughput increase is given by the ratio of raw data to "information" data. For example, in the case of matrix multiplication (to be described in detail later), assume that two bytes of information is the result obtained from 256 raw bytes. Thus, the system improvement is evident in that only two bytes of information are brought to the CPU rather than 256 raw numbers. That is, an improvement by a factor of 128.

Depending on the amount of data path logic included in the chips and the number of chips included in the system, the number of MIPS and the throughput improvement may be orders of magnitude higher than the 128 of the previous example. The design of the chip allows easy expansion to provide the desired amount of distributed parallel processing power by simply increasing the number of chips.

The economics of the commodity memory business force participants to maximize device density while minimizing process and package costs. The transfer of computational workload from the CPUs to the memories takes advantage of memory manufacturing discipline while greatly reducing the required CPU bus bandwidth. The preferred embodiment design also allows the system designer flexibility in setting processing power vs cost as the number of processing elements is defined by the memory chip count.

BRIEF DESCRIPTION OF THE DRAWINGS

The drawings are schematic for clarity.

FIGS. 5a–c are schematics of a third preferred embodiment memory;

FIG. 13 shows the pinout of the sixth preferred embodiment memory;

DESCRIPTION OF THE PREFERRED EMBODIMENTS

Figure 1A:
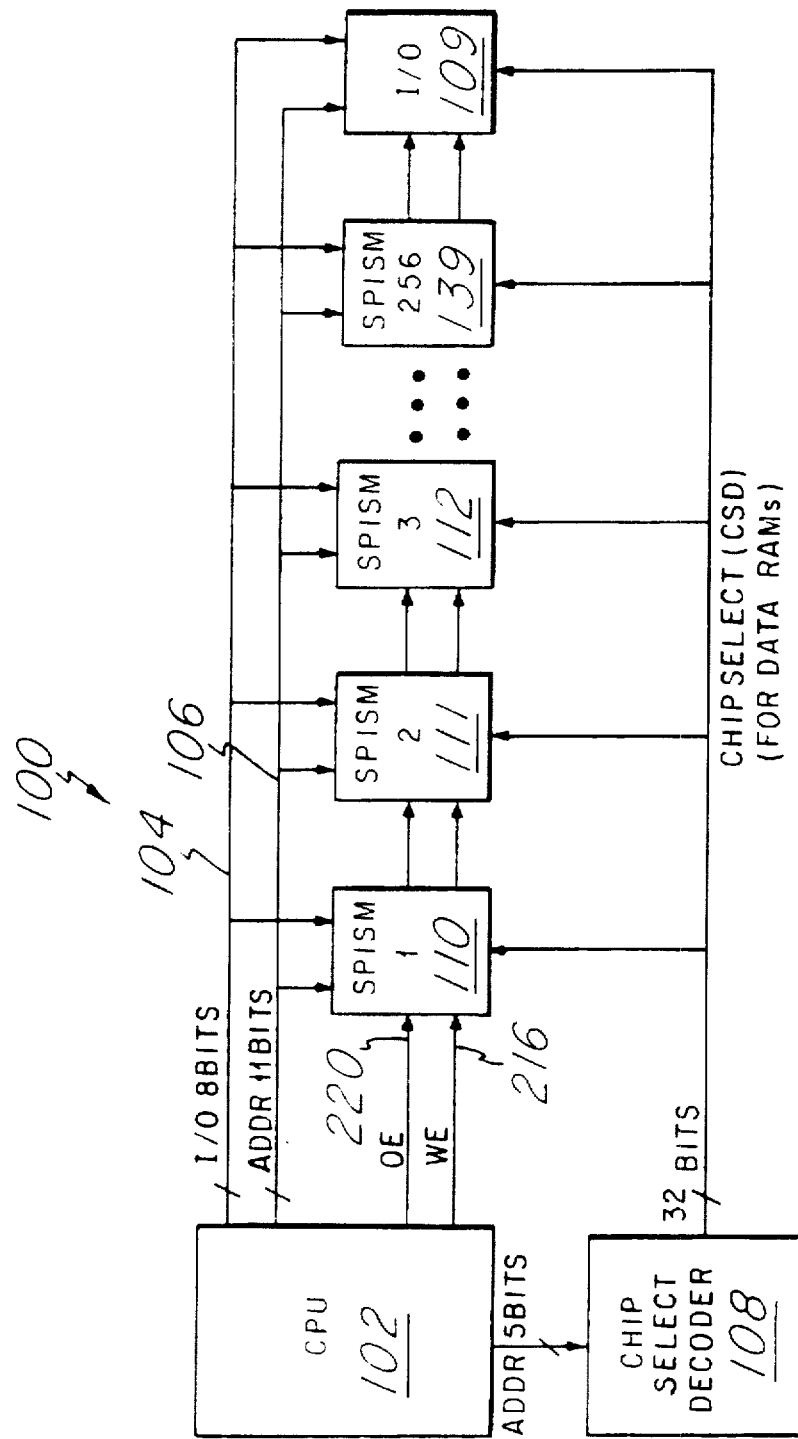
FIGS. 1a–c illustrate in block diagrams first preferred embodiment memories and system and addressing.

FIG. 1a is a block diagram showing first preferred embodiment memories 110, 111, 112, . . . 139 connected into a system 100 which includes a central processing unit (CPU) 102, 8-bit data bus 104, 11-bit address bus 106 (memories 110, 111, 112, . . . , 139 each has a 2K by 8 SRAM (Static Random Access Memory) section), 5-bit chip select decoder 108 for the thirty memory chips 110, 111, 112, . . . 139, and the I/O (Input/Output) 109. CPU 102 may be a simple processor such as a Motorola 6800 or Intel 8080 and has Write Enable and Ready pins connecting to each of the memories 110, 111, . . . 139. System 100 is particularly adapted for computation intensive applications such as digital signal processing due to the structure of memories 110, 111, . . . 139 as described in the following paragraphs, although general purpose processing may be performed with each of the memories 110, 111, . . . 139 acting as a 2K by 8 SRAM for a total of memory 60K by 8.

Figure 1B:
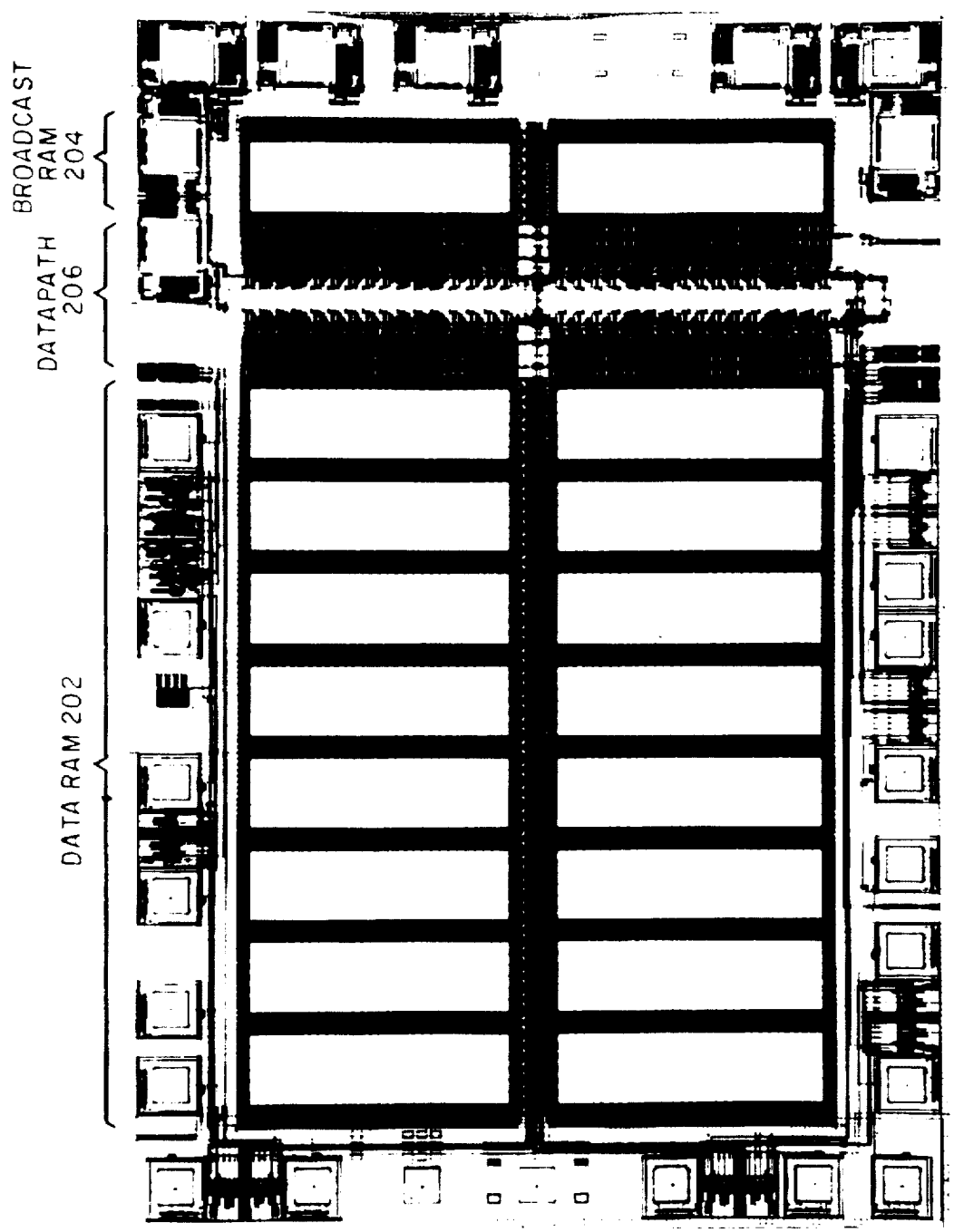
Figure 2:
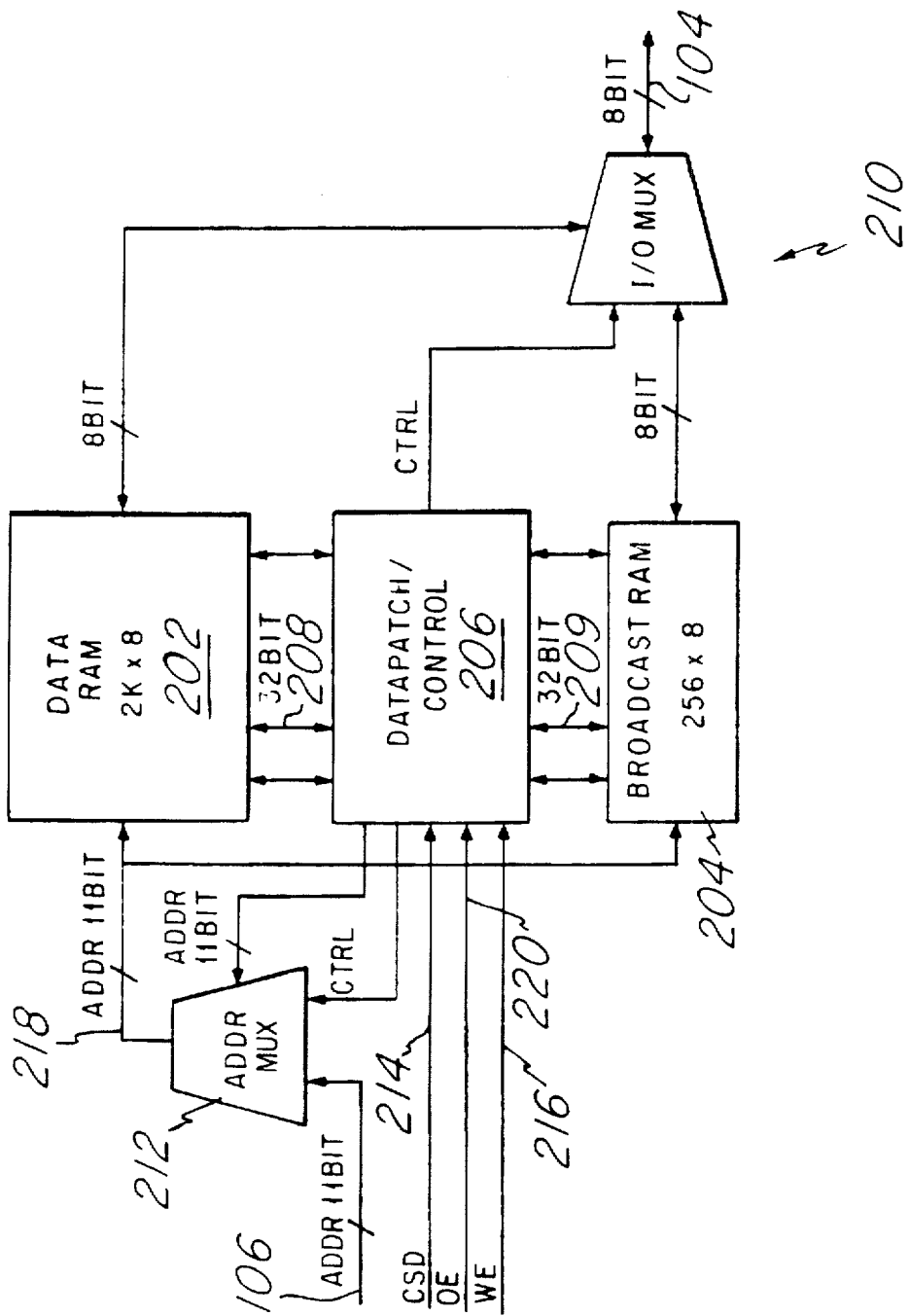
FIG. 2 is a block diagram of a first preferred embodiment memory.

Each memory 110, 111, 112, . . . 139 is in fact a dual memory (data memory and broadcast memory) plus an embedded data path that includes application specific logic; see FIGS. 1b and 2. The term broadcast memory is used to refer to a memory portion of memory chip 110–139 that is simultaneously accessible, for example by a broadcast read or write from a CPU, with other like-memory portions of other memory chips 110–139. Embedding logic in the memory chip provides the on-chip advantages of low cost bandwidth and very fast memory access. Further, the inclusion of a broadcast memory in each chip allows the system to simultaneously use each chip's data path Processing Elements for massively parallel distributed computation. These memory chips share a standard pinout with a family of SRAM memories.

As the chip layout FIG. 1b shows, each memory consists of three major circuit blocks:

a) A 2K×8 SRAM referred to as the Data RAM or Data Memory 202, b) The Application Logic and Data Path 206, and c) A 256 x 8 SRAM referred to as the Broadcast RAM or Broadcast Memory 204.

The chip floorplan strongly reflects the three components. From top to bottom, the Data Memory, the Application logic, and the Broadcast memory can be seen with clean demarcations of the Data Memory to logic and of the Logic to Broadcast Memory boundaries. The Data memory section contains all the addresses, chip select logic, and the $V_{cc}$ pads. The Broadcast Memory segment contains all I/O pads and $V_{ss}$. This deliberate floorplan design methodology allows programmatic chip configuration to easily accommodate customized Application Logic sections of various sizes. The logic could be custom designed (gate arrays, standard cells, etc.), or configurable by the user by means of fuse or antifuse programming for specific applications. The logic can also be somewhat general, or even programmable logic with on-chip instruction decode to appear as a Harvard architecture. A higher density design could use a pinout similar to the standard 32K×8 SRAM and the CPU could have 32-bit addresses.

The first preferred embodiment also may utilize external signal pins for some of the logic that could be included in the chip.

Figure 1C:
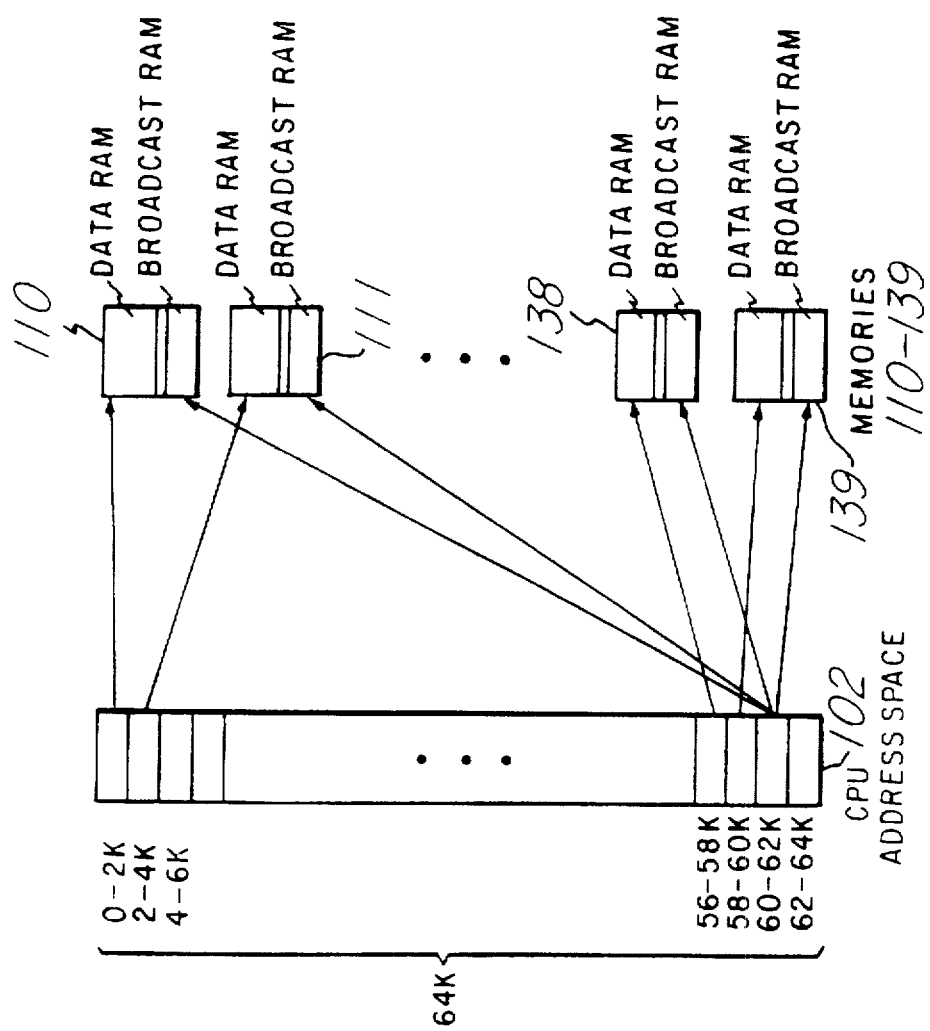

Consider the system of FIG. 1a with 30 2K×8 memories for a 60K byte memory system. Each chip's Data Memory is mapped onto the CPU's address space as in a von Neumann system. Specifically, CPU addresses 0–2K will be occupied by chip 110, addresses 2K–4K by chip 111, and so on. However, map the 256 bytes of every chip's Broadcast Memory to occupy the same CPU address space. By this choice it is possible for Broadcast Memories in all chips to respond simultaneously to a WRITE by the CPU. Assume that CPU address space 60 K-62K is used for this purpose. Only 256 bytes of this region correspond to actual memory in each chip. FIG. 1c illustrates this mapping. The conventional method of memory system Chip Select is shown in FIG. 1a where the CPU provides five high order address bits to perform Chip Select decoding. The first preferred embodiment method of Chip Select also uses the five high order address bits decoding for Data Memory access but uses a register on each chip for access to the Broadcast Memory as follows. The programmable Broadcast Memory position in CPU address space is set using an Initialization register (the "CSB (Broadcast Memory Chip Select) register") on each chip. Initialization of the CSB registers may be used to partition the system of chips into groups for response to Broadcast transmissions from the CPU. Initialization may be performed by the CPU at any time, allowing simple system reconfiguration. Initialization is performed on individual chips sequentially by writing to a series of two special addresses a number of times. This event is required to occur sequentially a number of times to eliminate the probability of random occurrence of writes to Data Memory appearing as Initialization. An event counter on each chip detects the sequence and then data on the data bus is written to the CSB register which defines the group for the chip. The clock for the event counter is supplied by an Address Transition Detection (ATD) circuit that pulses once for every address change. This is why the event is a series of two different addresses. Recall that the usual five high order address bit chip select singles out one chip at a time for this CSB register write during Initialization, but is inactive during broadcast instruction detection.

All chips view the activity on the address bus, allowing its use for the broadcast of instructions. The design allows the simultaneous interrogation for instructions by all chips as the five high order address bit chip select is not requried to be active for instruction interrogation. The group identity is included in the broadcast instruction and only the chips in the requested group respond to the command. The instruction field is 11 bits for the 2K×8 organization of the first preferred embodiment chips; the first three bits specify the command, one of the next five bits generate the ATD signal, and the last three bits define the group the chip belongs to by comparison with the stored value in the CSB register For example, the following table shows a possible encoding with RRR a designation for the group:

| Instruction | Address bits |
| --- | --- |
| Begin Broadcast Write Mode | 000 00001 RRR |
| | 000 00000 RRR |
| Terminate Broadcast Write Mode | 001 00001 RRR |
| | 001 00000 RRR |
| Begin Local Computation | 010 00001 RRR |
| | 010 00000 RRR |
| Begin Self-Test Mode | 011 00001 RRR |
| | 011 00000 RRR |
| Interrupt Local Computation | 100 00001 RRR |
| | 100 00000 RRR |

A chip's even counter is incremented when the control logic senses a sequential occurrence of: the data on the address bus agrees with an instruction, the middle bits are as expected, and the requested group matches the group set in the CSB register. The event counter is satisfied when it reaches a statistically derived number of sequential events. The control logic circuitry then begins the requested operation for all chips in that group.

For example, suppose that the system has been initialized into four broadcast groups: 000, 001, 010, and 011. To instruct group 001 to Begin Broadcast Write Mode, CPU 102 would first Read an arbitrary chip's 000 00001 001 address, then Read address 000 00000 001 to provide an ATD generated clock pulse which causes the event counter to increment on all chips in group 001. A sequence of such Reads satisfies the event counter in each chip in group 001, which informs the on-chip control logic to perform the requested command 000 (Begin Broadcast Write Mode). In this instruction, the Broadcast memory chip select (CSB) for all chips in group 001 would become active. Then CPU 102 can execute a series of normal write cycles which will write to the Broadcast memory of each chip in group 001 simultaneously. One chip may have both CSB and Chip Select for the Data Memory (CSD) active during Broadcast Write Mode, so the on-chip logic interprets this as a write to the chip's broadcast memory. When CPU 102 completes the Broadcast Write task, it repeats the process but with the instruction now to Terminate Broadcast Write Mode by putting 001 00001 001 on the address bus. This informs the chips in group 001 to deactivate CSB and go into a normal mode.

Note that this chip select scheme has the advantages of:
1. No special printed circuit board wiring;
2. Programmable "soft" location in CPU address space of the Broadcast RAM of each chip in the system. This facilitates system reconfiguration.
3. No additional pins required over the standard SRAM package.
4. Allows simultaneous broadcasting of instructions from the CPU to any or all of the chips in the system. Instructions may be used to initiate such chip operations as local computation or self test. An alternative chip select scheme uses a combination of chip-level and board-level decoding to allow selection of one (or more) Broadcast Memories in a given CPU address space as follows. Consider the system of FIG. 1a with thirty 2K×8 memories for a 60 K byte memory system. Each chip's Data Memory is mapped onto CPU 102's address space as in a conventional system. Specifically, CPU address 0–2K will be occupied by chip 110, addresses 2K–4K by chip 111, and so forth with addresses 58K–60 K occupied by chip 139. The 2K interval of each Data Memory is defined by the 11-bit address bus 106. In the alternative chip select scheme the upper five address bits normally used to decode thirty-two individual chip select CSD signals are available to all of the memory chips 110–139, each of which views the activity in the entire CPU address space in order to decode both CSD and CSB on-chip. The chip package has five additional pins for this purpose. Each of the five high order address signals are inverted at board level and both the true and complement are routed by each memory chip. The system designer then connects the chips to either true or complement of each signal. More simply, each chip may contain the inverters and the connection of true or complement may be performed a register on-chip.

To generate CSB and to allow the capability to partition the chips' Broadcast Memories into groups, a special memory address register on each chip is used to store that chip's Broadcast Memory Chip Select location. This is similar to the CSB register of the previously-described chip select scheme. The true and complement of each of the five high order address bits are available on-chip with a set of five inverters. The values in the register determine whether the true or complement value is used to generate CSB, thus CSB is again a programmable entity.

If all chips' Broadcast Memories are mapped to occupy the same address space, then it is possible for Broadcast Memories in all chips to be written to simultaneously. CPU address space 60 K to 60.25K could be used for this purpose. The 256 bytes of this region correspond to actual Broadcast Memory locations on each chip. FIG. 1c illustrates this mapping.

FIG. 2 is a schematic block diagram of first preferred memory 110; memory 110 is fabricated as a silicon CMOS (Complementary Metal Oxide Silicon) integrated circuit and packaged with the same pinout as a standard 16K SRAM organized as 2K by 8. This implies that a system with existing 16K memory chips could be converted to a system similar to system 100 by merely replacing the 16K memory chips with chips like memory 110. Memory 110 includes a 2K by 8 SRAM 202 (the Data RAM), a 256 by 8 SRAM 204 (the Broadcast RAM), Logic 206 (which includes the local Datapath with Application Logic Processing Elements), local 32-bit bus 208 between the Data RAM and the Datapath and local 32-bit bus 209 between the Broadcast RAM and the Datapath, 8-bit input/output port 210 which connects Data RAM 202 and also Broadcast RAM 204 to data bus 104, address multiplexer 212, Chip Select for Data Memory (CSD) input 214, Write Enable (WE) input 216, local address bus 218 which receives the 11-bit address from multiplexer 212, and Memory ready output or Output Enable (OE) input 220 (depending upon the CPU type). To preserve the standard SRAM pin-out, the external Ready pin is optional, although it is available for applications where standard pinout is not required. The Ready function will be performed by setting a reserved "flag" location in the Data RAM to a "not ready" value when local computation is begun in the memory. CPU 102 is only allowed to interrupt the local computation to poll the memory chips for the ready signal. Polling is done by a normal read. Interrupt is an instruction described infra.

Broadcast RAM 204 is written to without the CSD signal present for memory 110; that is, all of the Broadcast RAMs of the memories 110, 111, . . . 139 occupy the same address space of the CPU and may be written to simultaneously. The addresses of Broadcast RAM 204 occupy the upper eight bits of the eleven bit addresses. Data is written into or read from Data RAM 202 by CPU 102 by putting the address on address bus 106, activating CSD for memory 110, and activating WE. Thus memory 110 operates in this mode as a standard 2K by 8 memory. A truth table for read/write:

| CSD | Write Enable | Function |
|-----|--------------|----------|
| Low | Low | Read from Data RAM |
| Low | High | Write to Data RAM |
| High | Low | |
| High | High | Broadcast Instruction Detection |

Figure 3:
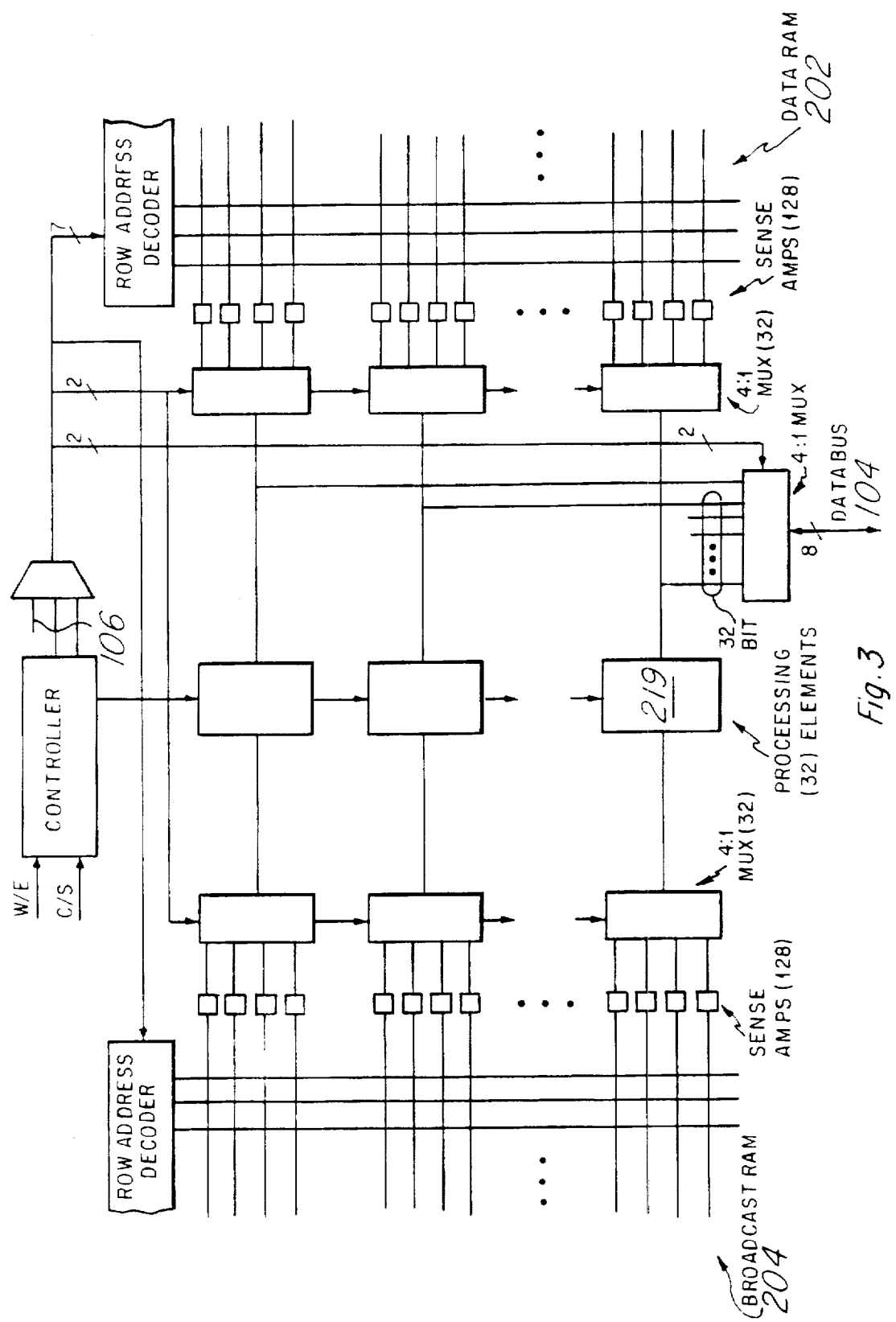
FIG. 3 is a diagram of a portion of a first preferred embodiment memory.

FIG. 3 is a more detailed view of memory 110 illustrating some of circuitry. Memory 110 includes an array of 128 columns of 128 cells with a memory cell pitch of 15×20 µm. The Broadcast Memory is essentially a 128×16 section of the main array. The design is implemented in 1 µm CMOS technology. The ideal architecture would provide a 128 bit internal data path to maximize local data processing throughput. However, designing random logic in a SRAM cell pitch is quite difficult. Therefore, memory 110 uses a 4:1 multiplexing of the bit lines to sense amplifiers (and data path logic) and beefed up sense amplifiers to produce full logic levels internal to the chip. Thus, the internal data path is 128/4=32 bits wide; and 32 processing elements 219 are shown, although the number of processing elements may differ as illustrated in the third preferred embodiment. Also, note that input/output port 210 in FIG. 2 is merely illustrative of the connection of Data Bus 104 to the 32-bit internal bus.

The decision to use 4:1 bit line multiplexing allows considerable flexibility in the design of the Application logic needed to implement algorithms. For example, the space between adjacent columns is sufficient to to allow construction of multipliers and adders. The data path logic signals are at a 60 µm pitch which matches the non-extended gate array cell pitch. With respect to the Data Memory, the 4:1 multiplexing causes adjacent data (with respect to the data path) to appear in every fourth column. Thus, the data path signals are further organized in an ascending order so that any binary operation can pass "carry" signals, et cetera easily. In addition to its use as a 2K by 8 SRAM by CPU 102, memory 110 has a second mode of operation which includes local computation in the Datapath in Logic 206, and in this mode memory 110 appears as a slow memory to CPU 102. During local computation the Ready 220 output is low and when the local computation is complete Ready 220 goes high; the Ready outputs from memories 110, 111, . . . 139 may be ANDed to CPU 102. As mentioned previously, in the standard 2K by 8 SRAM pinout configuration, no external Ready pin is employed to inform the CPU that local computation has completed. The CPU acts as a master to the slave memories at all times. The CPU polls the memories to determine if local computation has completed by reading a reserved location in each memory which holds the "ready flag" value. Thus, the CPU may perform Read operations by interrupting local computation by setting CSD low and proceeding as a usual read. If computation was interrupted, control logic 206 saves the state of the data path before proceeding with the CPU's read, then resumes when the CPU sets CSD high and WE low.

Local computation will be described by an example of a matrix operating on a vector: matrix T with elements $T_{ij}$ for $1 \leq i \leq M$ and $1 \leq j \leq N$ acting on vector V with components $V_j$ for $1 \leq j \leq N$ to give an M-component vector W with components $W_i, n = \Sigma_j T_{ij} V_j$. It is assumed that the elements $T_{ij}$ and the components $V_j$ are 8 bits and that the resulting components $W_i$ are 16 bits. The resulting components could be more than 16 bits, but for many Digital Signal Processing applications the summation will include many negative terms. The matrix $T_{ij}$ is partitioned into blocks of rows with one block written to each of the Data RAMs; this permits parallel computation of the matrix multiplication. It should be clear that the matrix size is not determined by the chip memory array size and it is possible to solve very large problems with multiple memories 110, 111, . . . due to the ability to segment matrices into blocks for parallel computation. First, CPU 102 writes the matrix elements $T_{ij}$ into the Data RAMs 204 of memories 110, 111, . . . sequentially by first selecting the particular memory (for example, memory 110) with the CSD signal, putting an address (in the 2K by 8 RAM 202) on 11-bit address bus 106, the matrix element on 8-bit data bus 104, and putting WE high. Note that the combination of low CSD plus high WE for memory 110 is interpreted by Logic 206 to have multiplexer 212 select the address from address bus 106 (and not from Logic 206) to put on local bus 218, and to have the row and column decoders of Data RAM 202 active, and to inactivate the row and column decoders of Broadcast RAM 204. Thus the 8-bit matrix element on data bus 104 is written to the addressed 8 bits of Data RAM 202. This is repeated until Data RAM 202 has all of the required matrix elements written in. Note also that the unselected memories (111, 112, . . .) have a high CSD but their Logic units do not interpret the high going WE as writing to the Broadcast RAMs because the alternating addresses to satisfy the event counter do not occur, so nothing is written to either the Data RAMs or the Broadcsat RAMs. After CPU 102 has written matrix elements into Data RAM 202 of memory 110, it writes matrix elements into the Data RAM of memory 111, and so forth until the matrix is loaded into the Data RAMs of the memories 110, 111, 112, . . .

Second, CPU 102 writes the vector components $V_j$ plus a local compute instruction into all of the Broadcast RAMs of memories 110, 111, . . . simultaneously by first alternating the two addresses used to satisfy each chip's event counter and inform the on-chip Logic to activate the Broadcast Memory Chip Select (CSB) for write cycles to the Broadcast RAM. Note that there is no grouping of chips with the CSB registers for this computation. CPU 102 then makes normal writes that are simultaneously into all of the Broadcast RAMs. Logic 206 sets multiplexer 212 to pass the address from address bus 106, deactivates the decoders for Data RAM 202, and activates the decoders for Broadcast RAM 204 to write the vector components plus local compute instruction into Broadcast RAM 204. The alternating addresses method is used to terminate the Broadcast Memory write as previously described.

Third, in prepartion for local computation, the CPU may first store instruction information in the Broadcast RAMs which the control Logic 206 uses to determine the size of the matrix block that has been allocated to each memory and thereby set address loop counts for the required internal read operations. One should observe that this could be greatly generalized to see that the control Logic 206 could be viewed exactly as the control logic of a conventional microprocessor. Thus, the application specific data path can be designed to perform complex function limited only by chip area and the desire to fit into a standard pinout package.

When CPU 102 sets WE low, and with CSD high to all chips 110, 111, . . . the Logic 206 of each memory initiates the local computation sequence. Logic 206 first generates the address(es) for the location in Broadcast RAM 204 that would contain any local compute instruction and set multiplexer 212 to pass this address, sets the Ready flag (or pin) to not ready, plus deactives the decoders for Data RAM 202 and activates the decoders of Broadcast RAM 204 and reads the contents of the address(es). If the address(es) contain the local compute instruction, then Logic 206 for each memory simultaneously goes into the following loop:

(i) Logic 206 first generates the address for the row in Broadcast RAM containing the first four components ($V_1$, $V_2$, $V_3$, $V_4$) of the vector V, so the components appear in parallel on 32-bit internal bus 209.

(ii) Logic 206 next generates the address for the row in Data RAM 202 containing the first four elements of a row of the matrix, say $T_{k1}$, $T_{k2}$, $T_{k3}$, and $T_{k4}$, so the matrix elements appear in parallel on 32-bit internal bus 208; of course, k differs for the different memories 110, 111, . . . 139.

(iii) Logic 206 then multiplies each matrix element on bus 208 with the corresponding vector component on 209 (forming the products $T_{kj}V_j$ for each j for $1 \leq j \leq 4$).

(iv) Logic 206 adds the products obtained from step (iii) to yield $\Sigma_{1 \leq j \leq 4} T_{kj} V_j$ which is just a first partial sum for the component $W_k$; again, this is happening simultaneously in all memories 110, 111, . . . 139 for various ks.

(v) Without changing the row address, the column address for Broadcast RAM 204 is incremented (that is, the 4:1 multiplexing of the columns is used) and another internal read of Broadcast RAM 204 is performed to present the next four components ($V_5$, $V_6$, $V_7$, $V_8$) of the vector on bus 209.

(vi) Without changing the row address, the column address for Data RAM 202 is incremented (again by the 4:1 multiplexers) and another internal read of Data RAM 202 is performed to put the next four matrix elements ($T_{k5}$, $T_{k6}$, $T_{k7}$, $T_{k8}$) of the $k^{th}$ row of the matrix on bus 208.

(vii) Steps (iii) and (iv) are repeated to yield $\Sigma_{5 \leq j \leq 8} T_{kj} V_j$ which is added to the previous $\Sigma_{1 \leq j \leq 4} T_{kj} V_j$ to form $\Sigma_{1 \leq j \leq 8} T_{kj} V_j$.

(viii) Steps (v) and (vi) and (vii) are repeated two more times with incrementing by the 4:1 multiplexers; the accumulated partial sum is then $\Sigma_{1 \leq j \leq 16} T_{kj} V_j$.

(ix) Steps (i) to (viii) are repeated with the rows of Broadcast RAM 204 and the rows of Data RAM 202 corresponding to the remaining components of the vector V and the remaining elements of the $k^{th}$ row of matrix T; each time the partial sum formed is accumulated to the partial sum from the previous steps and the final result is the component $W_k$. Logic 206 then directs an internal write and stores $W_k$ in unused columns of the rows of Data RAM 202 that hold the $k^{th}$ row matrix elements. This happens simultaneously in each of the memories 110, 111, . . . 139. If Data RAM 202 has stored the block of rows k through k+n of matrix T, then steps (i) to (ix) are repeated n times with the remaining rows of matrix elements in Data RAM 202 but the same vector components $V_j$ from Broadcast RAM 204 to form and store the components $W_{k+1}, W_{k+2}, \ldots, W_{k+n}$. For example, if V has 100 components, then 7 rows of Broadcast RAM 204 (out of the total of 16 rows) are needed to store the components, and the seventh row will only be 4/16 used. Similarly, if Data RAM 202 has matrix elements stored in the same manner (use 7 rows of RAM for each matrix row despite the seventh row of RAM being only one quarter used), then 18 matrix rows can be stored (so n=17 and T can be as large as a 540 by 100 matrix), and there is sufficient space in every seventh row for storing the corresponding $W_{k+j}$. Additionally, there are two unused rows of Data RAM 202 that can hold the Ready flag and other items.

The loop terminates after all of the rows of Data RAM 202 used to store the block of matrix rows have been gone through. Simultaneously memories 111, 112, . . . are computing and storing all of the other components $W_1$, $W_2$, . . . WM. Logic 206 then sets the Ready flag (or pin 220) high, and CPU 102 may read the result from Data RAM 202 by putting CSD low while retaining WE low so Logic 206 will have multiplexer 212 pass the addresses on bus 106 and activate the decoders for Data RAM 202. This local computation avoids the fetching of each of the matrix elements by CPU 102 for computation and thus avoids much traffic on busses 104 and 106. Indeed, during the local computations by memories 110, 111, . . . . , CPU 102 may be involved in other tasks. A second example of local computation again describes matrix multiplication by a vector. Matrix $T_{ij}$ is 252×252. Vector $V_j$ has 252 elements. Thus, the result will be the 252 element Vector $W_j$. Assume that each element is 8 bits wide. The 2K×8 Data RAM cannot hold the full matrix $T_{ij}$ so T is broken into 32 blocks of 8 rows with 252 elements in each row. Each block occupies 16,128 bits which is 126 columns of the 128×128 bit Data RAM. The remaining 4 bytes of the Data RAM are to be used to store the result. The required number of memory chips is 32.

The problem begins by writing the 32 blocks of matrix $T_{ij}$ into all 32 Data RAMs sequentially as usual (as described in the previous example). Vector $V_j$ is then written into all Broadcast RAMs concurrently. Recall that the Broadcast RAM is 256 bytes (16 rows by 128 columns) so Vector $V_j$ occupies 252 bytes (16 rows by 252 columns). Internal to the memory, the operations are all 32 bit wide and control of computation is greatly eased by aligning the computation to this width. This is accomplished by setting up matrix block segmentation rules for the system. Our 252 element examples avoid this step for pedagogical simplification. The required data path circuitry in Logic 206 includes four 8-bit Booth multipliers and an adder to sum the products. An alternate data path configuration would include a single 8-bit multiplier and an adder. This would also require registers for the operands and a multiplexer to select one of the four sets of operands. Clearly, this reduces the number of parallel Processing Elements (PEs) but would reduce data path silicon area.

The local computation is then initiated in all 32 chips which sets the Ready flag to not ready. The CPU is now free to perform other tasks. The sequence of computation would present the first four elements (32 bits) of matrix $T_{ij}$ from the Data RAM and the first 4 elements of Vector $V_j$ from the Broadcast RAM to the data path logic circuitry. When the multiply and add are done, the next four corresponding elements of both $T_{ij}$ and $V_j$ are presented from the Data and Broadcast RAMs, respectively, until all 252 elements in the first row of matrix $T_{ij}$ are operated on. The single 16-bit result element for that row is then stored in the available Data RAM space. This routine is repeated until all 8 rows of the block are operated on. When done, the Ready signal is set in all chips and the CPU may read the eight 8-bit result elements from each of the 32 chips. We now analyze the performance of the system just described: For memory load, the CPU would need to direct 252×8=63,504 write operations for the initial memory load of all 32 (31.5 actually) Data RAMs. The CPU then can quickly do a broadcast write of the vector to all Broadcast RAMs in only 252 write operations. The calculation of each element required a number of internal reads. For 252 8-bit elements, each memory's 32 bit data path with four 8-bit multipliers can process four elements at a time. Thus, 252/4=63 reads of both Data RAM and Broadcast RAM are performed. If each computation requires about the same time as four read cycles for a Booth multiplier, the total local read and calculation time for one row is 63×5=315 cycles. This loop is repeated eight times in each memory to generate the eight result elements of the final vector. Writing the 252 16-bit result elements back to the Data RAM requires two cycles for each element for an additional 504 cycles. Thus, each memory requires 3024 cycles to perform the local computation.

The CPU only needs to perform 2×8=16 read operations on the first 31 chips and 2×4=8 reads of the 32nd memory for a total of 504 reads to retrieve the 252 16-bit element result vector. Thus, if we include the 63,504 cycle memory load time, the total operation time is:

| Data RAM load | Broadcast write | Local comp | Result read | |
|---|---|---|---|---|
| 63,504 | +252 | +3024 | +504 | = 66,780 cycles. |

For some applications the I/O to memory is not an issue, then we can ignore the load cycles. The total cycles then may be considered as the local calculation, and result retrieval time which is only 3780 cycles. Conventional system: The memory load is a constant 63,756 cycles. Assume the very best case for the conventional system so that calculation and read operations are pipelined in the CPU and that there are no lost cycles missing data during reads. Assume that the CPU employs the same Booth multiplier/accumulator circuitry so that the number of clock cycles per operation is the same as in the preferred embodiment data path. The CPU must have 252×252+252 board level reads for the matrix and the vector elements for an additional 63,756 cycles. Assuming perfect pipelining of reads and computation, we have 4 cycles required for each of the 252×252 ($n^2$) computations for a total of 259,016 cycles. The total operation then requires 317,772 cycles for a conventional system if memory load time is included and 254,016 cycles if it is not.

The performance improvement is thus a factor of four if memory load is considered. If we assume that memory load is a given, we see that the preferred embodiment system provides a factor of 69 improvement in speed. Consider the electrical power cost function that was discussed previously, we see that the preferred embodiment system reduced the CPU to memory board-level I/O by a factor of 63,756/252≅253 by reducing the raw data to information before sending it to the CPU. If one considers the additional multiplicative factor of the ratio of boardlevel bus capacitance to chip-level bus capacitance, it is clear that system power requirements have been significantly reduced.

A third example of local computation describes matrix-matrix multiplication. Matrix $T_{ij}$ is 252×252. Matrix $U_{ij}$ also has 252×252 elements. The operation is exactly the same as multiplication by a vector, we now simply treat each column of matrix $U_{ij}$ as we did the vector Vj. Matrix $T_{ij}$ is again segmented into blocks; the first 31 memories again receive eight rows and the 32nd memory gets the last four rows. Thus, the memory load of matrix $T_{ij}$ again requires 63,504 cycles. Matrix $U_{ij}$ is broadcast a segment at a time to all Broadcast RAMs. The 16 row by 128 column Broadcast RAM will hold one column of matrix $U_{ij}$ (analogous to vector $V_j$ in the first and second examples). Each column thus takes 252 write cycles from CPU to Broadcast RAM. Thus, a total of 252×252=63,504 cycles are required to load the matrix $U_{ij}$ into Broadcast RAM. Note that these examples assume that loads from mass storage to RAM requires one cycle per word (matrix element). The local computation is then initiated by the CPU. The internal reads required to present the operands to the data path again require 252/4=63 cycles for both the Data and Broadcast RAMs. Adding another four cycles for computation of the 63 operand presentations, we again have 315 cycles for each of the eight rows of matrix $T_{ij}$ in the individual memories. Thus a total of 3024 cycles are again required for local computation of one column of matrix $U_{ij}$. This is repeated for each of the 252 columns of matrix $U_{ij}$ for a total local computation of 762,048 cycles. Note that all 32 memories perform this in parallel. The CPU then polls the memories and sees that local computation has completed on all chips. It then reads the 16-bit result matrix elements from the Data RAMs which takes 252×252×2=127,008 read cycles. Thus, the first preferred embodiment system requires 192,024 cycles if memory load of $T_{ij}$ is included. If $T_{ij}$ load is ignored, then 128,520 cycles are required to retrieve the 252 16-bit element result vector. Thus, if we include the 63,504 cycle memory load time, the total operation time is:

| Data RAM load | Broadcast write | Local computation | Result read | |
|---|---|---|---|---|
| 63,504 | +63,504 | +1,270,008 | +127,008 | = 1,524,096 cycles. |

A conventional system would require $2n^2$=127,008 cycles for memory load of the two matrices $T_{ij}$ and $U_{ij}$. Another $2n^2$=127,008 cycles are required to read the data from memory to the CPU. If we again assume that computation and memory read operations are pipelined, no cycles are seen for the read operations and we have 8×252×252×252=128,024,064 cycles for computation. Thus, 128,151,072 cycles are required for the conventional system. Clearly, no CPU could hold this matrix in internal memory, so we have give the conventional system a best case comparison by not including the cycle required to write the computed results back to memory. The preferred embodiment system, of course, has stored the results.

To compare, if memory load of matrices $T_{ij}$ and $U_{ij}$ are included, the preferred embodiment system provides a factor of 91 improvement. Including all memory load cycles, the improvement provided by the system is a factor of 84.

A fourth example of local computation is a sparse matrix operating on a vector. The Data Memory of each chip is filled with elements of the sparse matrix. Presume that 64 bit words are used for the matrix elements and that 16 bit words can be used for the row tag and column tag for the matrix element; also 64 bit words for partial inner product results. Thus, three 32 bit words hold the tags and the matrix element. The datapath 206 will contain a 64 bit multiplier and accumulator plus logic to test if the current word has a counterpart in the Broadcast Memory to by multiplied against. Again, the vector to be operated on is broadcast to all chips simultaneously and the control logic 206 sequences through the Data Memory as in the first example. The Data Memory is filled by CPU 102 with tagged words of the sparse matrix in any order, but grouping words from the same matrix row into the same chip's Data Memory reduces result data that need to be read by CPU 102.

The matrix elements are cycled through as previously described and the tags are tested to see if the word is to be mulitplied, and, if it is, where to store the result. Note that not all of the vector may fit in the Broadcast Memory and it will need to be broadcast in pieces as in the case of the nonsparse matrix multiplication example. Each time a piece of the vector is broadcast each chip must cycle through all of the matrix elements to see which words are to be multiplied; this need to cycle through all of the matrix elements makes the number of multiplications per second smaller than in the nonsparse case, which only has to cycle through the portion of the data memory corresponding with the piece of the vector which has been broadcast.

The inner products are stored in the Data Memory, the number of locations that need to be reserved for them is equal to the number of different rows that are on the chip.

After the full vector has been broadcast and the local computations finished, CPU 102 can read the resultant vector. It needs to go to each chip sequentially, reading inner products for the rows that are stored in the DAta Memory.

The system performance for a sparse matrix acting on a vector can be estimated as follows. Assume each memory has 16K Data Memory with 2K Broadcast Memory, 20 nsec internal cycle time, 40 nsec external cycle time, with a PLD to buffer and arrange data from CPU 102, and a pipelined datapath read/multiply/accumulate. Then for a 256 by 256 sparse matrix with an average of 10 nonzero elements per row, each Data Memory will hold about 18 rows of the matrix: 10 64-bit words per matrix row plus one 64-bit word for the inner product of the row with the vector plus row and column tags (16 bits each) for each of these 11 64-bit words per row implies a total of 33 32-bit words per matrix row. Thus a 16K Data Memory will hold 15 matrix rows, and about 18 chips are needed to hold the entire matrix. The Broadcast Memory holds one eighth of the vector.

Time budget:

1. Broadcast write: (32 words/broadcast×64 bits/word×40 nsec/cycle)/8 bits/cycle=10.24 μsec for each broadcast.

2. Local computation: 150 words×600 nsec/64 bit floating point multiply accumulate=90 μsec for each broadcast.

3. Repeat steps 1 and 2 eight times to complete the vector; total braodcast and compute time about 800 μsec.

4. Result collection by CPU: 256 inner products of 64 bits at 100 nsec per 32 bits=51, μsec.

5. Total calculation time is about 850 μsec.

As matrix size increases, the number of nonzero matrix elements increases linearly, the time to broadcast the vector increases linearly, the local computation increases linearly, and the time to collect the results increases linearly.

Figure 15:
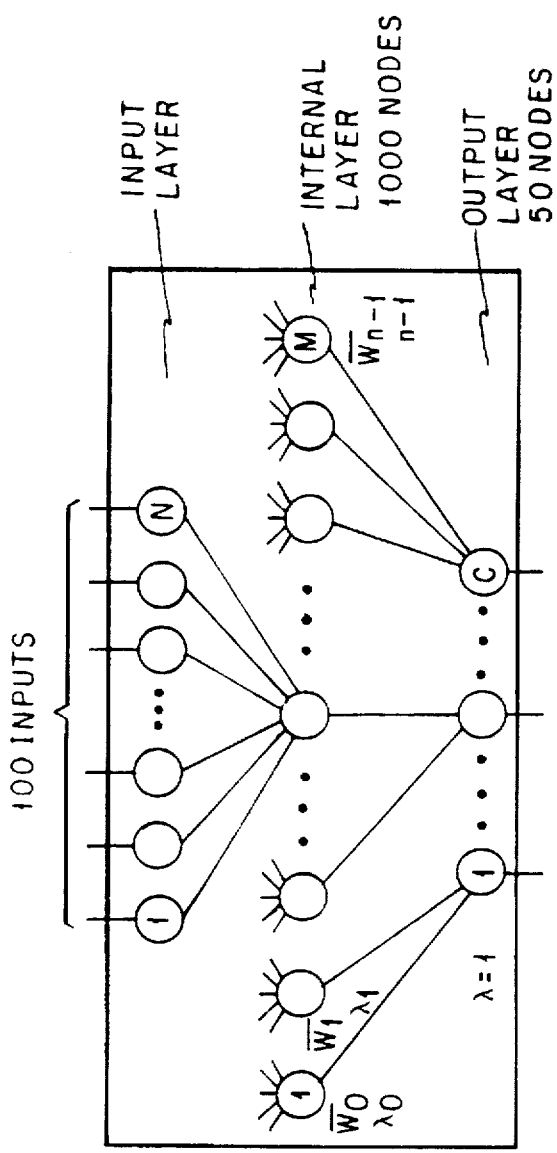
FIGS. 15–16 illustrate an application for the preferred embodiements of the invention.
Figure 16:
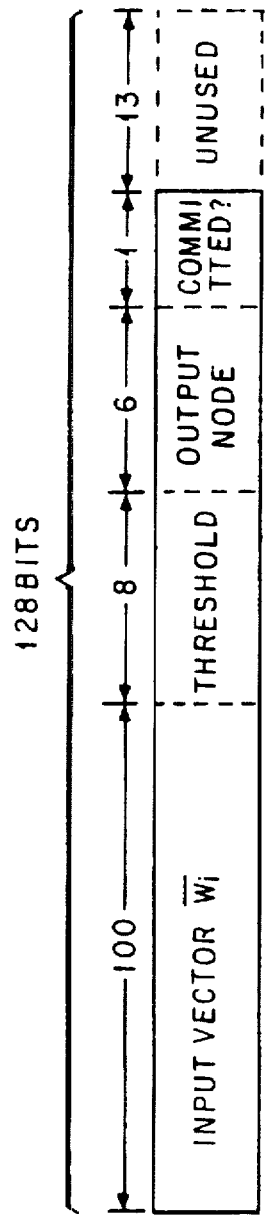

Another example illustrates implementation of a neural network algorithm described in U.S. Pat. No. 4,326,259 with the system 100. In particular, for a network with 100 inputs; 1,000 internal nodes each connect to all inputs (responding to some and not to others according to a vector W); each internal node has a settable threshold A; 50 output nodes potentially connected to any or all of the input nodes and each output node with threshold 1; and 50 outputs, one for each output node (see FIG. 15); the Data Memory is 1,000 words, each 128 bits wide. The number of words is equal to the number of internal nodes. The 128 bits in each word store four things: the first 100 bits is a vector representing the input vector W that the input responds to, the next 8 bits store the threshold A, the next six bits identify the one output node (part of the alogrithm) that this internal node outputs to, and the next bit indicates if this internal node is committed (part of the alogrithm); see FIG. 16. A final word in the Data Memory is used to store the 50 bit output vector of the chip.

The datapath consist of a 100 bit Hamming distance calculator, comparator to compare the resulting Hamming distance with the requried threshold, plus additional control logic specific to the alogrithm and the learning phase of the algorithm, together with the usual control logic to sequence through the Data Memory and detect instructions. The Broadcast Memory stores the 100 bit input vector to the chip known as the input layer in the algorithm. In normal operation (not during training) the chip operates as follows. The ouptut vector is set to all zeros, the input vector is written into the Broadcast Memory, and the chip cylces through the 1,000 128-bit Data Memory locations to calculate the output vector, and the CPU reads the location containing the output vector. When the $j^{th}$ 128-bit Data Memory location is read, if the vector is committed (115th bit), then the Hamming distance between the first 100 bits representing $W_i$ and the input vector is calculated and compared with the 8-bit threshold $\lambda_j$ of this internal node. If the Hamming distance is greater than the threshold, then the bit in the output vector identified by the next six bits of the 128-bit location is set.

In learning mode an internal cell is committed by setting the "committed" bit, setting the vecotr W, threshold, and output node to the required values; this is a simple memory write operation. Committing a new output cell is trivial: its bit number is just written in the internal cell that is to connect to it. Increasing the threshold on all internal nodes t cause none of them to fire requries cycling through the internal nodes, calculating the Hamming distance to the input, and setting the threshold for each so that the node just does not fire.

The time for the chip to operate in normal mode is the time for the chip to cycle through all of the internal nodes. For learning mode, committing internal and output nodes is the time for a memory write, switching off internal nodes for a particular input is two times normal mode as each access must not only calculate the Hamming distance but write back the new threshold.

Using a 16K Data Memory implies eight chips are needed for the system.

A Built-In Self-Test (BIST) and Automatic Fault Tolerance Scheme suitable for smart RAMs such as memories 110 can be achieved by adding a third mode of operation to memories 110 that causes a self-test mode to run as indicated in the chip select discussion, supra. Indeed, CPU 102 writes a Begin Self-Test Mode command and the datapath control logic then initializes the memories to designer-determined values, cycles thru the data of all addresses, and compares the results with the designer determined expected result value. Fails are flagged in special RAM locations. Tests of the datapath control logic may also be included; indeed for memories adapted to matrix multiplication the test of the datapath could be simply a multiplication of all zero matrices so a result other than zero would set a fail flag. All chips perform BIST in parallel. When complete, the CPU then polls (performs a read of a fail flag) each chip and notes the addresses of failed chips, and switches them out in address space with a redundant chip supplied on the board. Typically, BIST would be performed prior to loading data in the Data RAMs.

Figure 4:
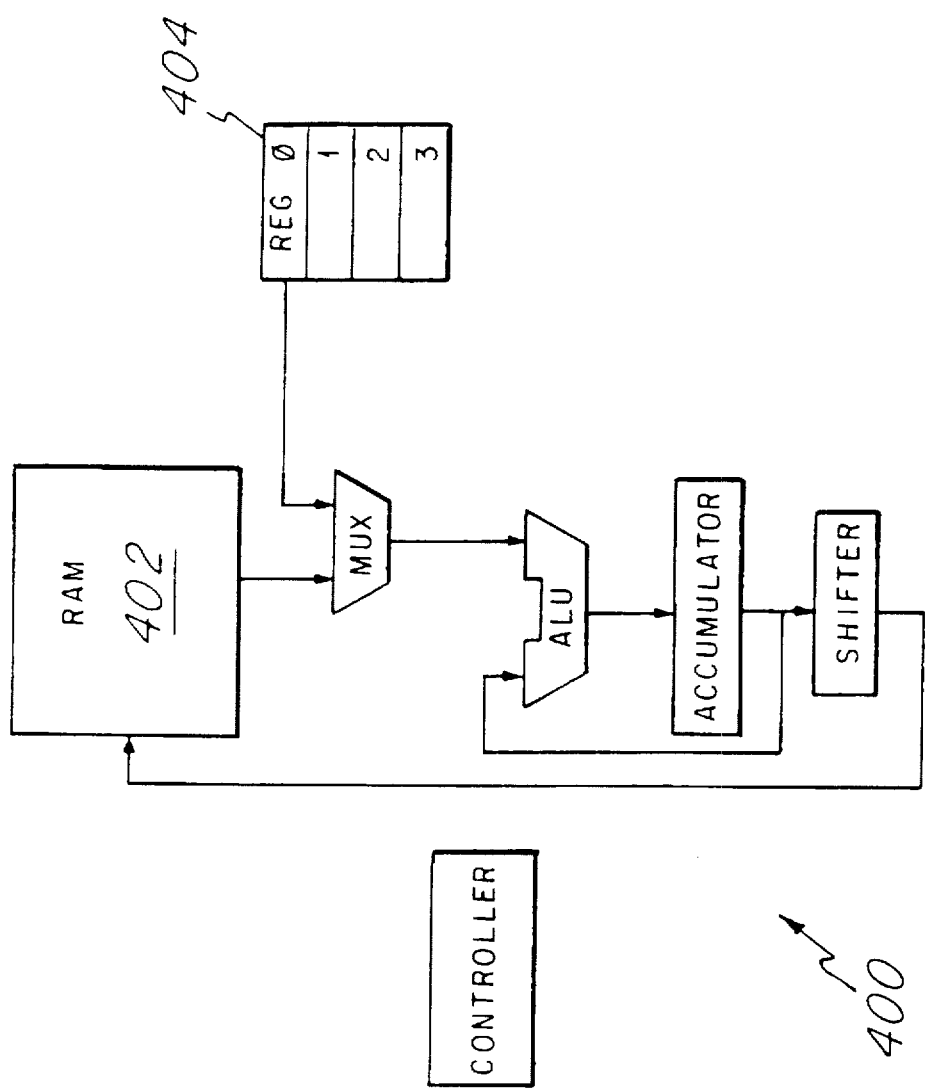
FIG. 4 is a block diagram of a second preferred embodiment memory.

FIG. 4 is a schematic block diagram of a second preferred embodiment memory 400 that includes local computation circuitry but with standard memory package pinout. Memory 400 is configured for search through a linked list of vectors in RAM 402. Each vector would have one or more fields and a pointer to the next vector in the list; and a search through the list would typically include the following steps:

Set up the address of a vector in RAM 402.

Fetch the field(s) of interest of the vector from RAM 402.

Compare the value in the fetched field against a specific condition to see if the condition is satisfied. (The condition may by stored in Registers 404.)

If the condition is satisfied, then terminate the search;

Else, update the fetched field (write to RAM 402) and fetch the pointer to the next vector from the current vector.

Check the pointer to see if the search is to be terminated; else repeat the steps for the next vector.

The Registers 404 are the analog of Broadcast RAM 204 in the first preferred embodiment, and RAM 402 is the analog of Data RAM 202. Only a small instruction set is needed for the search program. For example, LOADAC (load accumulator), STOREAC (store accumulator), ADD (add to accumulator), SUB (subtract from accumulator), BRANCH $\leq 0$, BRANCH $>0$, BRANCH=0, BRANCH$\neq 0$, BRANCH$\leq 0$, BRANCH$>0$(six accumulator test conditions), IDLE, and MAX (put in accumulator the maximum of the current accumulator and the input).

Other types of local computations may also be performed with memories 110, 111, 112, . . . such as computation of $l_1$ and $l_2$ norms of vectors. In particular, digital signal processing often requires the finding the "distance" between a test vector, $\overline{V}$ and each of a number of reference vectors, $W^r$ for $1 \leq r \leq R$, and the commonly used measurements of distance are the $l_1$ and $l_2$ norms of the differences, $\overline{V}_j$-$W^r$. For example, the $l_1$ norm of the difference is $$| \overline{V} - W^r |_1 = \sum_{j=1}^{N} | \overline{V}_j - W_j^r |$$

and may be computed by loading the components $W_j^r$ into Data RAM 202 and the components $\overline{V}$ into the Broadcast RAM 204 as previously described and then doing the subtraction and absolute valuing in parallel in Logic 206 for each reference vector.

Figure 5A:
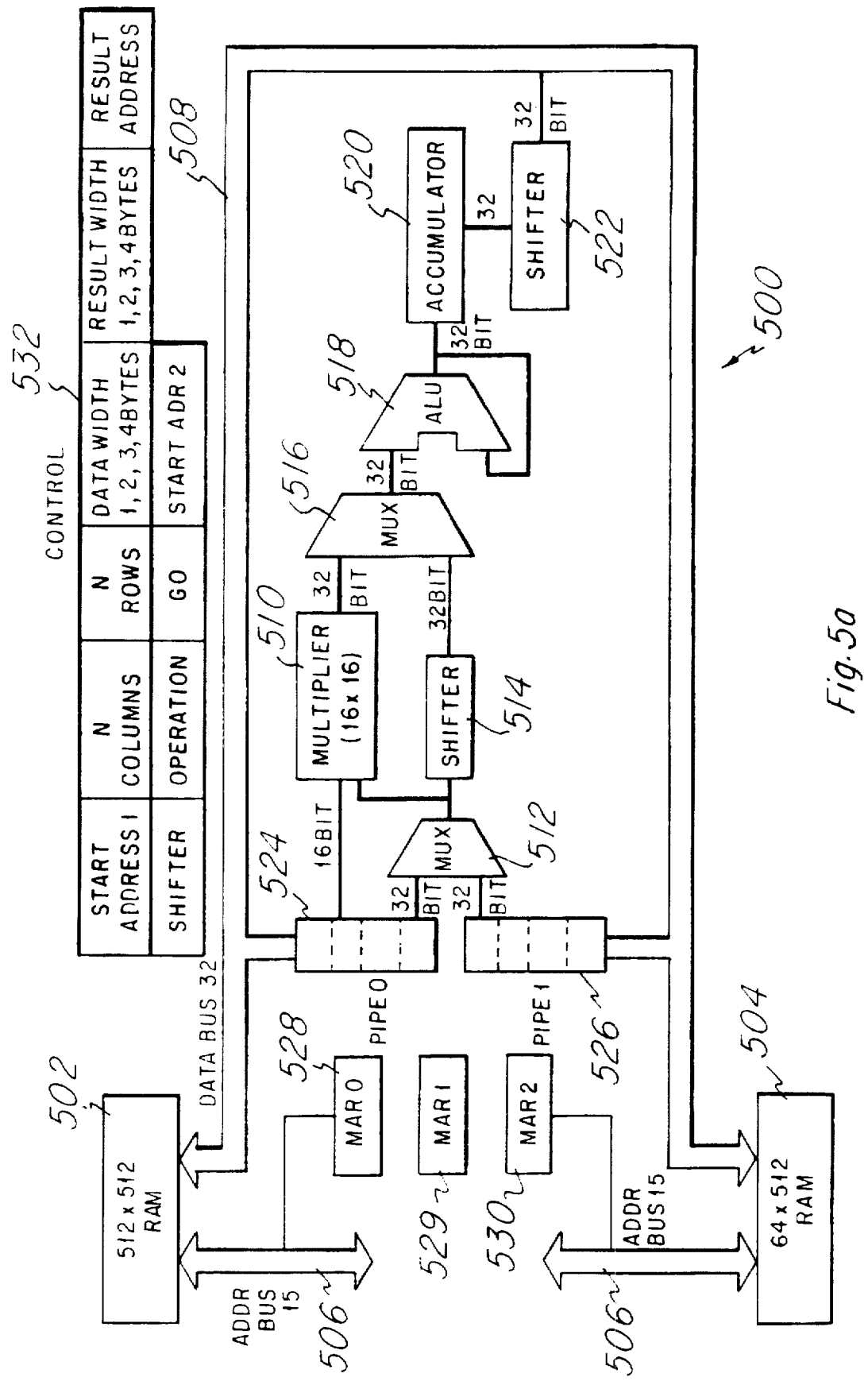

FIG. 5a is a schematic block diagram of a third preferred embodiment memory 500 that includes local computation circuitry but with standard memory package pinout analogous to first preferred embodiment memory 110. Memory 500 is especially adapted for a multiply and accumulate computation as occurs in the calculation of $l_1$ and $l_2$ norms of vectors and vector dot products. Memory 500 includes 256K Data RAM 502 which is organized as 32K×8 bits (512 by 512 array of memory cells which are multiplexed 16-to-1 to bus 508), 32K Broadcast RAM 504 which is organized as 4K×8 bits (64 by 512 array), 32-bit Data bus 508, 15-bit Address bus 506, a multiply-accumulate pipeline (16-bit by 16-bit multiplier 510, 32-bit multiplexer 512, 32-bit shifter 514, 32-bit multiplexer 516, 32-bit ALU 518 which has one entry feedback, 32-bit accumulator 520, and 32-bit shifter 522), 32-bit registers 524 and 526 that hold data just read in from the RAMs and unpack it in that 1, 2, 3 or 4 bytes of the contents are accessible as illustrated, Address registers 528-530 which auto-increment or auto-decrement with register 524 or 526 unloading, and ten control words 532 that can be programmed by the external CPU. The function of unpacking registers 524 and 526 is to allow the selection of the data bit width to be 1, 2, 3, or 4 bytes (8 bits equal 1 byte) even though the data bus is of fixed width (32-bits in this embodiment). An examplary implementation of unpacking register 524 could be four 8-bit registers which are written in parallel by Data bus 508. The "Data Width" control word generates four control signals which are then logically combined with a clock signal to control four banks of pass gates which place the desired data to multiplexer 512 inputs.

See FIG. 5b for a simple schematic. Unpacking registers 524 and 526 also allow pipelined data loading to multiplexer 512 without additional memory reads by shifting the data words as needed. This is controlled by the "Shifter" control word combined with the clock signal. Similarly, the "Operation" control word combined with the clock signal loads 16-bit data from the unpacking register 524 to multiplier 510. As with memory 110, Memory 500 is typically part of a system with a CPU and multiple memories similar to memory 500. The external data bus and multiplexer analogous to bus 104 and port 210 of FIG. 2 are not shown in FIG. 5a, and the external address bus is multiplexed with Address registers 528-530 as suggested in FIG. 5 and analogous to multiplexer 212 of FIG. 2.

Alternative arrangements include replacing the 16-to-1 multiplexing of the 512 bitlines of Data RAM 502 to 32-bit bus 508 with four 4-to-1 multiplexings of the 512 bitlines to four 32-bit busses and have four multiply-accumulate pipelines and pairs of 32-bit unpacking registers. Further, the 16-bit by 16-bit multiplier 510 could be replaced with a 24-bit by 24-bit or even a 32-bit by 32-bit multiplier.

Because a matrix can be viewed as consisting of n rows and m columns, the first three of the ten control words 532 specify the start address of a matrix, the number of rows, and the number of columns in a matrix. The fourth and fifth control words specify the width of the data; the sixth control word specifies the address at which the computed results are to be stored, the seventh control word sets up the shifter, the eighth control word sets up the configuration (multiplexers 512 and 516, auto increment or decrement, and so forth), the ninth control word is the GO word which when written to begins computation in the memory 500, and the tenth control word specifies the start address of the vector in Broadcast RAM 504. That is, when the GO word is written, the memory-address registers 528-530 are loaded, the shifters setup, and computations begin by reading from RAMs 502 and 504 into registers 524 and 526 and storing pipeline results back in RAM. As with memory 110, memory 500 may be part of a system which has reference data loaded into Data RAM 502 and input data simultaneously written to all Broadcast RAMS 504.

An exemplary application would be real time speech recognition which computes Euclidean distance of an input vector from stored reference frames. The reference frames are distributed equally amongst the memories in Data RAM and as the input vector comes in it is simultaneously written to the Broadcast RAMs and the GO word written to initiate simultaneous computation in each chip. Upon completion of the local computations the GO word is changed by the memory and the external CPU may read the results. In particular, consider the computation of $$d(n) = \sum_{i=1}^{4} x(i) r(n, i)$$

where $X = [x(1), x(2), x(3), x(4)]$ and $R(1) = [r(11), r(12), r(13), r(14)]$, n=8 and d(n) is a scalar requiring two bytes of storage. The r(i,j) are stored in data RAM 502. Suppose x(i) and r(i) are one byte wide each. The following sequence of steps discuss how the computation is done.

1. The external CPU writes the ten control words which in this example would be:

| | |
|---|---|
| START-ADDRESS 1 | = 100 (the start address of R) |
| N COLUMNS | = 4 |
| N ROWS | = 8 |
| DATA WIDTH | = 1 |
| RESULT WIDTH | = 2 |
| RESULT ADDRESS | = 300 (address at which the results are stored in sequence) |
| SHIFTER | = 0 |
| OPERATION | = Multiply-accumulate; autoincrement |
| GO | = to be written |
| START ADDRESS 2 | = Start address of X |

2. When the GO flag is written to by the main CPU, the start address of the r(i, j)s is loaded into MAR0 528, the result address is loaded into MAR1 529, and the start address of X is loaded into MAR2 530.

3. Accumulator 520 is zeroed. Using MAR0, a 32-bit word (r(1,1), r(1,2), r(1,3), r(1,4)) is read into unpacking register 524 (denoted PIPE0 in FIG. 5a), and using MAR2, the 32-bit word (x(1), x(2), x(3), x(4)) is loaded intp unpacking register 526 (denoted PIPE1 in FIG. 5a).

4. The Data Width control word defines the size of the operands that are fed to multiplier 510.

5. In this example, x(1) and r(1,1) (1 byte of the PIPE0 and PIPE1 contents) are fed to multiplier 510, and the product is accumulated in accumulator 520.

6. Next, the contents of PIPE0 and PIPE1 are shifted one byte so that in the next feed to multiplier 510 x(2) and r(1, 2) will be in position to become the operands, and as the contents are shifted, address registers MAR0 and MAR1 are automatically incremented; e.g., in the first pass, MAR0 would become 101 after incrementing.

7. Steps 5 and 6 are repeated for a count determined by the control word N COLUMNS which in this case is four. (If N COLUMNS were greater than four, then PIPE0 and PIPE1 would be filled by another memoryread as soon as they are emptied.)

8. After step 7 is complete, the result is in the accumulator and this is written back to RAM 502 using the address register MAR1 which is automatically incrementd after the write. In this example, if MAR1 equalled 300 before the write, then after incrementing, it would equal 302 because the control word RESULT WIDTH equals 2 (bytes). Also, note that at this point MAR0 is already pointing to the next R(j).

9. Steps 3 to 8 are repeated by a count determined by the control word N ROWS which in this example equals 8.

10. After completion of step 9, the GO flag is changed to another pattern flagging that the computations are complete.

Another example would be the difference-magnitude-accumulate between X and R. In this case the control word OPERATION would flag this difference-magnitude-operation to be performed. The execution of this computation would be similar to the one just described; the difference would only be in step 5 where the OPERATION control word would cause the logic to take the difference between x(i) and r(j, i), and the absolute of this would be accumulated.

Figure 5C:
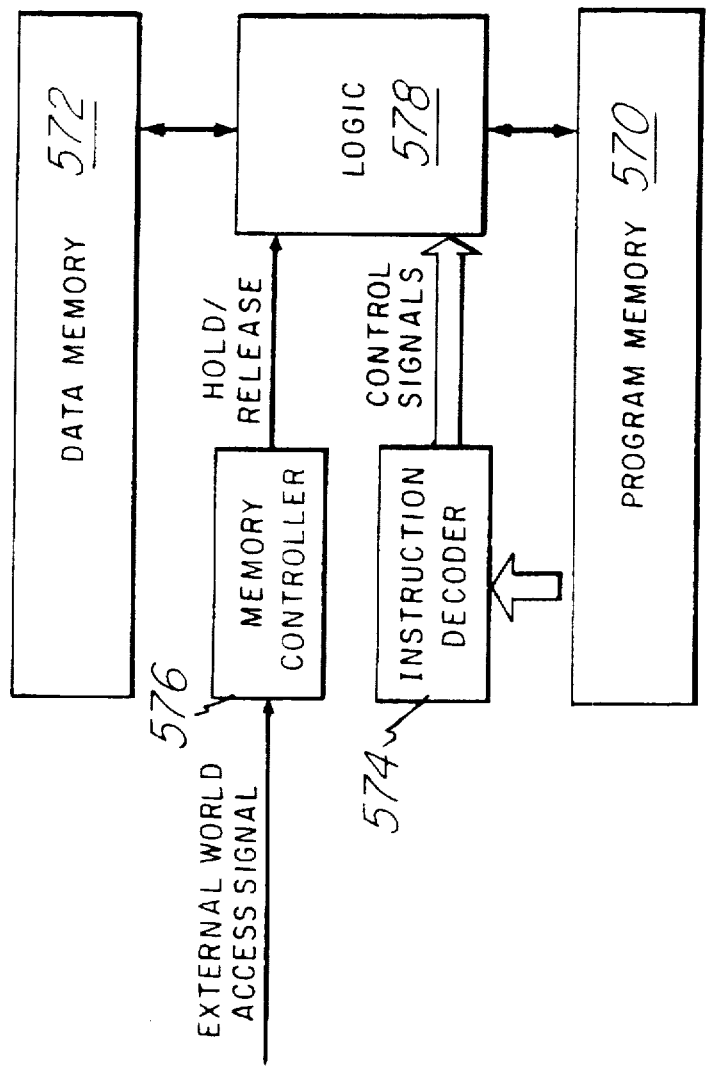

A more general version of the third preferred embodiment would be to replace the particular multiply-accumulate pipeline with a programmable processor and write programs into the Broadcast RAM. FIG. 5c shows memory chip 568 with the lower part 570 of the memory regarded as program memory and the upper part 572 as data memory. Program memory 570 is accessible from the external world (CPU) using the same I/O pins as data memory 572 as previously described. The on-chip decoder 574, memory-controller 576, and logic 578 provide the programmable processor. Instruction are fetched from program memory 570, decoded in decoder 574 which generates appropriate control signals to operate logic 578. When the external world accesses chip 568, memory-controller 576 puts logic 578 on hold; and when the external world access is completed, memory-controller 576 releases logic 578 which resumes execution.

Figure 6:
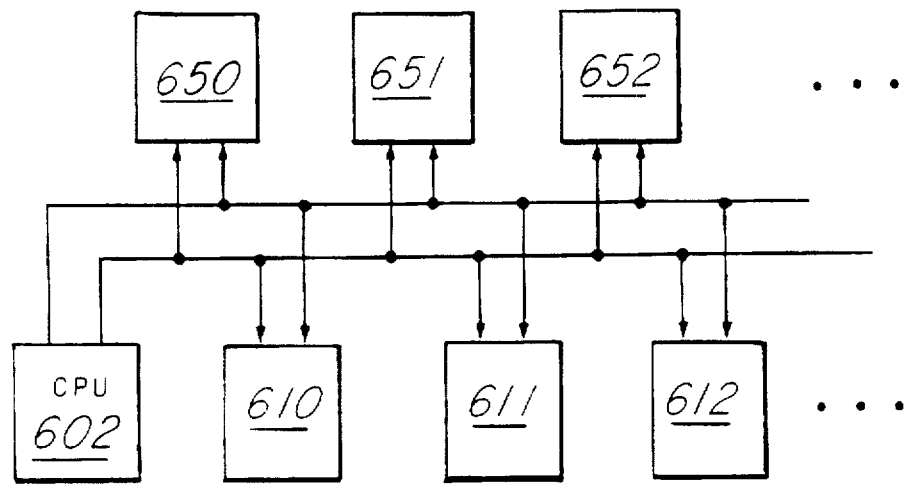
FIG. 6 is a diagram of a fourth preferred embodiment system.
Figure 7:
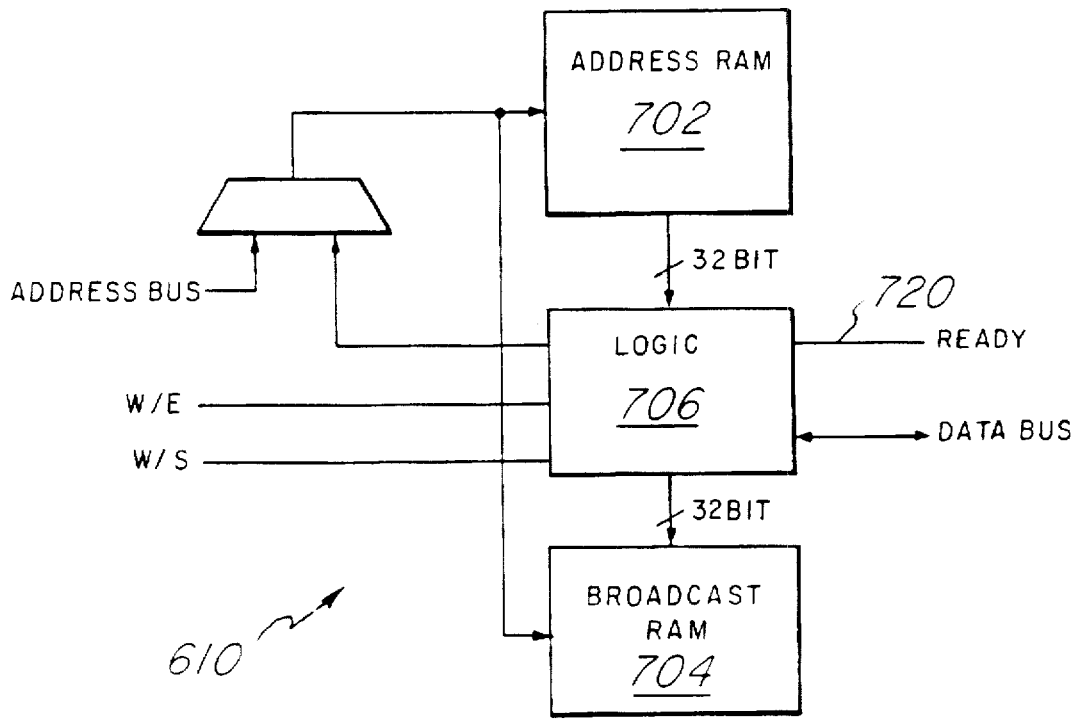
FIG. 7 is a block diagram of a fourth preferred embodiment memory.

A fourth preferred embodiment memory and system may be used as an address-associative memory (also called a Sparse Distributed Memory or a Kanerva Memory). FIG. 6 is a schematic block diagram of a fourth preferred memory system, generally denoted 600, which includes address memories 610, 611, 612, . . . and data memories 650, 651, 652 . . . . FIG. 7 is a schematic block diagram of fourth preferred embodiment memory 610 that includes Address RAM 702 (which corresponds to the Data RAM 202 of memory 110), Broadcast RAM 704, and Logic 706. Memory 610 together with other similar memories 611, 612, . . . form an address-associative memory system 600. An address-associative memory differs from a usual memory by permitting data stored at one address to be retrieved by reading a close-by address; thus a sort of fault tolerance is inherent. For example, an address-associative memory with a input address and a piece of input data could write the data to all memory locations with an address within a certain Hamming distance from the input address and the written data would not displace data already at any of these locations but would be added to it (each bit of the memory is effectively replaced by an up-down counter). An input address for reading data would activate all addresses within a certain Hamming distance from the input address and a bitwise thresholded sum of the data at all of these activated addresses creates the output data read.

In operation key addresses have been stored in Address RAM 702 and a test address to be written to or read from is simultaneously written to the Broadcast RAM of every memory 610, 611, . . . in a manner similar to that described in connection with the first preferred embodiment. Once the test address in written into the Broadcast RAM, then Logic 706 puts the Ready 720 output low and begins to compute the Hamming distance between the test address and each of the key addresses stored in Address RAM 702; the Hamming distance computations proceed in parallel in all memories 610, 611, . . . . When an key address if found within the required distance from the test address, Logic 706 may either store this in a part of the Address RAM for later polling by CPU 602 or may interrupt CPU 602 at each find. CPU 602 then reads the data for each found key address from a corresponding data memory 650, 651, . . . and bitwise sums and thresholds the data read to yield the output data.

For example, if addresses are 32 bits long (so there are about $4.3 \times 10^9$ possible addresses) and if 10,000 32-bit words, $A_1, A_2, \ldots A_{10,000}$, are randomly selected to be the key addresses, then the Hamming distance between $A_1$ and the closest other key address is expected to be roughly 4 and the Hamming distance between $A_1$ and the hundredth closest other key address is expected to be roughly 8–10. This rough approximation derives from the following approximation analysis: presume the key addresses have roughly half of their bits as 1's and half as 0's; next determine the cumulative probability distribution of the Hamming distance between a pair of key addresses by combinatorial anaylsis:

$$F(2n) = \sum_{j \leq n} \frac{\binom{16}{j}\binom{16}{j}}{\binom{32}{16}},$$

and then approximate the distribution of the order statistics for this probability distribution and find the Hamming distance that makes the cumulative distribution of the pertinent order statistic approximately one-half.

An alternative approximate analysis is as follows: for a given (key) address, the number of addresses at a Hamming distance of n is simply the number of ways of changing n bits in the given address, which is:

$$\binom{32}{n}$$

Thus the number of addresses within a Hamming distance of 10 from a given address is just the sum:

$$\sum_{1 \leq n \leq 10} \binom{32}{n}$$

which is roughly equal to 108,000,000. Thus about 2.5% of all addresses are within 10 of a given address; and the key addresses are randomly distributed, so about 250 key addresses (2.5% of the 10,000) are expected to be within 10 of a given address. Thus using a Hamming distance of 10 with the 10,000 32-bit key addresses will yield about 250 key addresses for each input address (whether or not the input address is one of the 10,000). The loading of data into system 600 proceeds as follows: first the 10,000 key addresses are generated (random number generator) and stored in the Address RAMs of the memories 610, 611, . . . , each Address RAM has room for 512 addresses, so memories 610, 611, . . . 629 provide sufficient space. CPU 602 also creates a lookup table correlating each key address with an address in Data memory 650, and in Data Memory 650 each data word occupies 256 bits organized as 32 by 8; thus Data Memory 650 must have at least 25.6 megabits. Next, 32-bit data is stored at an input address (or even to a random input 32-bit address) by intially finding the 250 or so key addresses of the 10,000 that are within a Hamming distance of 10 of the input address. Then CPU 602 writes the 32-bit data to each of the locations in Data Memory 650 that correspond to the found active addresses. These writes of the 32-bit data do not replace any data already stored at the data words, but rather is added to it: this is accomplished by using the 8 bits in the 32 by 8 organization of the data words. The 8 bits act as an up-down counter of range 128, and each bit of the 32-bit data word either increments (if the bit is a "1") or decrements (if the bit is a "0") the counter. Data memory 650 could have 32 parallel adders for this computation if the storage of data represents significant overhead time.

After the data is stored, data may be read by writing an input address to the Broadcast RAMs, locally finding all 100 or so active addresses within a Hamming distance of 10 of the input address, reading the 100 or so corresponding data words from Data memory 650, averaging the 8-bit up-down counters over these 100 or so data words on a counterby-counter basis, and thresholding to convert the averages to a 32-bit binary output.

Figure 8:
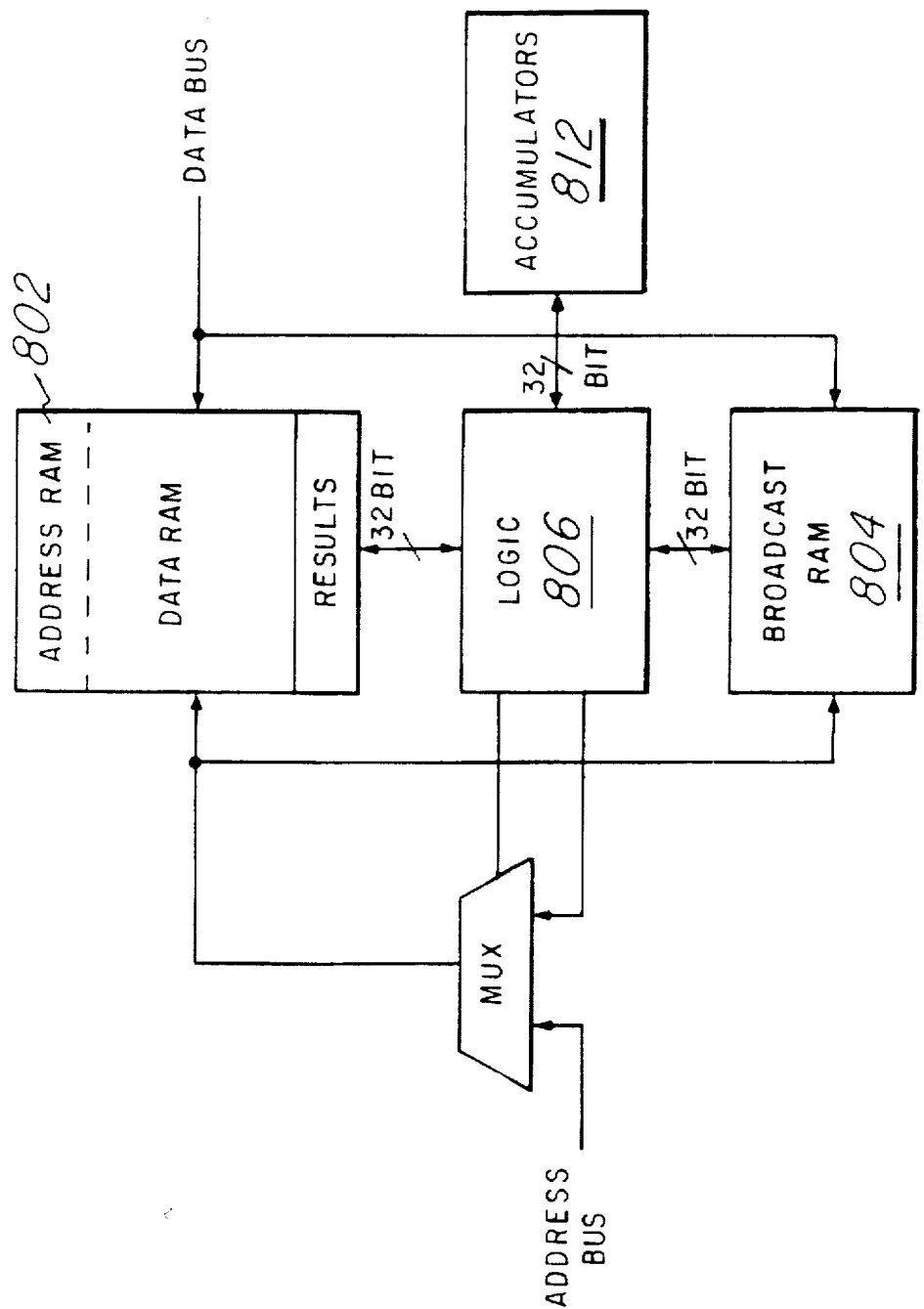
FIGS. 8–9 are block diagrams of a fifth preferred embodiment memory.

The fifth preferred embodiment is another address-associative memory system but with different memory organization. FIG. 8 is a schematic block diagram of a fifth preferred embodiment memory 800. Memory 800 includes RAM 802 which would contain both the key addresses and their data together with an accumulator in Logic 806 for the data write to the key addresses. Memory 800 has the same pinout as a standard 2K by 8 SRAM and includes RAM 802 which is also organized as 2K by 8 and appears to the CPU as a 2K by 8. RAM 802 can contain six 256-bit key addresses plus associated 256-item data with each data item being 8 bits to act as an up-down counter of range 128. This leaves a little more than 2K bits in RAM 802 for storing results and which may be read later by CPU. For address-associative memory operation, the CPU can write a key address to thirty-two successive 8-bit bytes and the associated data to the next 256 successive bytes in RAM 802. Thus memories 800 do not require a lookup table to correlate a key address with its stored data. Instead, given an input address, CPU simultaneously writes the input address (as thirty-two bytes) to the Broadcast RAM 804 of each memory 800 in the system together with a local search instruction. Logic 806 then reads the local search instruction, sets the Ready signal low, and begins a computation of the Hamming distance between the input address and each of the six key addresses stored in RAM 802. If a key address is found to be within a Hamming distance of 10 of the input address, then Logic 806 interrupts its cycling through the active addresses and reads the data associated with the found active address and adds it to the accumulators 812, and may store the results in the approximately 2K of RAM 802 unused for key address-data. After the all of the six key addresses have been compared to the input address and all corresponding data, if any, is summed and stored in RAM 802, the Ready signal is set high. CPU can then read the results of each memory 800 and sum and threshold to recover the data read.

To write data to memory 800 is more involved than reading because the data must be added to the preexisting data at each key address close to the input address. Either CPU can read the stored data for each key address found within a Hamming distance of 10 of the input address and add the new data and restore, or the data can be simply sent with the input address to the Broadcast RAM 804 and Logic 806 can do the additions in accumulators 812.

Of course, other distance metrics besides Hamming distance could be used to identify key addresses.

Figure 10:
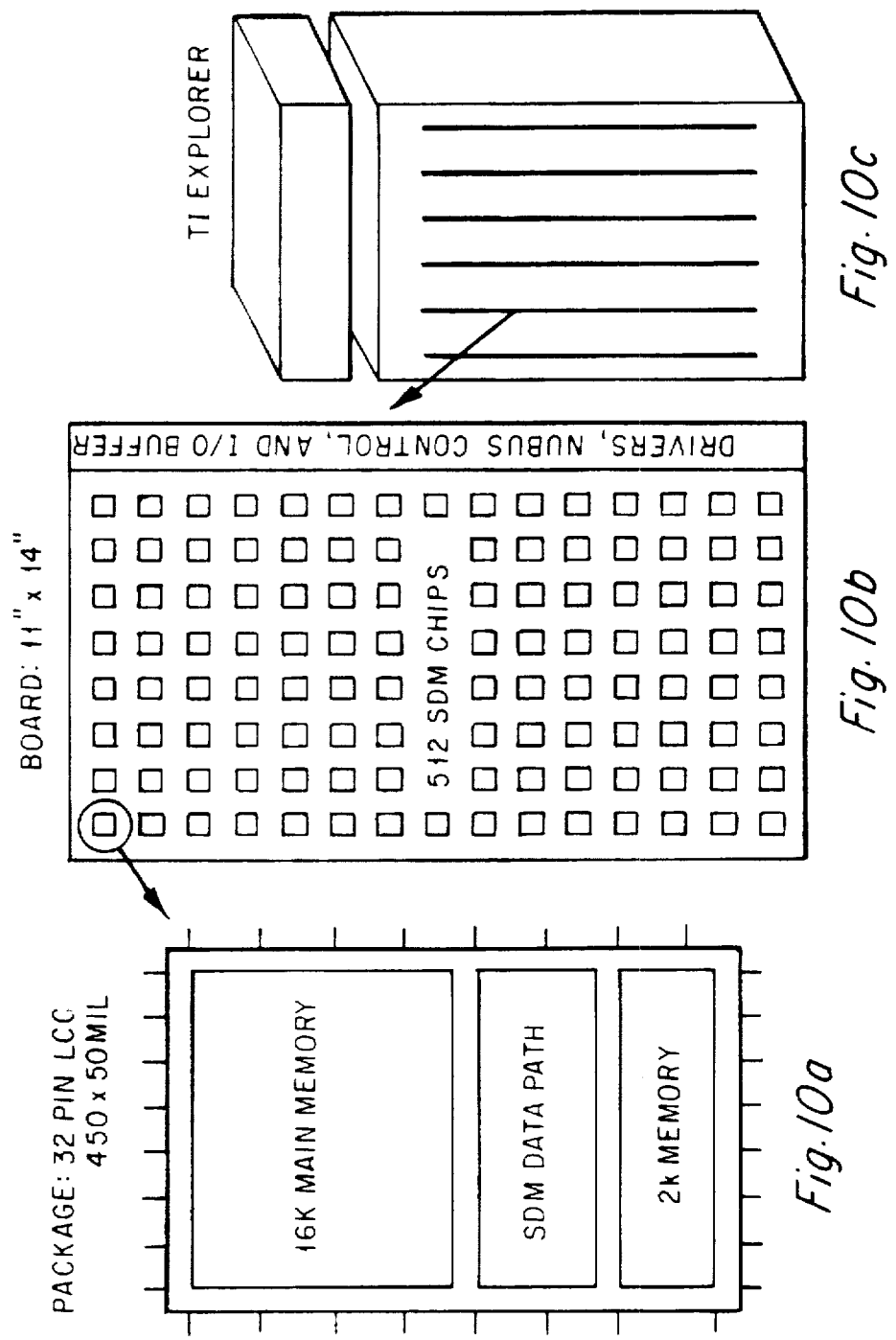
FIGS. 10a–c are diagrams of a sixth preferred embodiment system.

A sixth preferred embodiment system uses many memories such as memory 800 in a sparse distributed memory (SDM) machine 900 and schematically illustrated in FIGS. 10a–c. The building block for the SDM machine is a memory/processor chip containing 16K bits of memory and 32 bits of custom datapath. The memory of each chip is used to store six, 256 bits wide, SDM addresss-data pairs (FIG. 10a). The datapath of each chip controls and executes the SDM read and write operations, and has special logic to compute hamming distance and do SDM style accumulations (FIG. 10a).

The SDM machine consists of one or two boards (depending on required capacity) predominantly populated by 512 of the memory/processor chips (FIG. 10b). The boards plug, for the purpose of this embodiment, into a TI Explorer Lisp machine (FIG. 10c). They appear to the Lisp CPU as memory boards. The Lisp CPU interfaces with them by writing the Sparse Distributed Memory (SDM) address (and data on a write) to predetermined memory locations and the memory/processor chips do the SDM computation. On a SDM write no further action is required, on an SDM read the processor waits ($\approx$100 μsec) and then reads the SDM (non thresholded) data from predetermined memory locations from each board in sequence. The Lisp CPU accumulates the data from each board and thresholds the result.

Each board holds 512 memory/processor chips, and can store 3072 SDM locations, each location being 256 bits long, using 8 bit data counters. The CPU can access the SDM for a read or write 10,000 times per second as follows:

Data transfer to board from LISP CPU: 1 μsec
Data into processor/memory chips: 2 μsec
Chip calculation time: 3.6 μsec
Data accumulation time on read: 84 μsec
Time off one board: 6.8 μsec Capacity can be increased by using multiple boards.

The SDM memory boards are a hybrid between standard memory and massive parallelism. They are constructed from standard memory technology with embedded processors optimized for the SDM computation. A 32 bit datapath is embedded in each 16K memory chip. With 512 chips per board this provides 16K×512=8 Mbits of memory and 32×512=16K bits of datapath per board.

Because the boards appear to the Lisp CPU as memory boards they are easy to add to the system. In the case of the TI Explorer, they will be plugged in to the Nubus backplane, and used as memory boards. To use them to do the SDM computation the Explorer system must be inhibited from using the boards as paging space. The software to do the SDM read or write will write to predetermined memory locations on the board that are decoded by special board hardware to activate the memory/processor chips for the SDM compuation.

Figure 9:
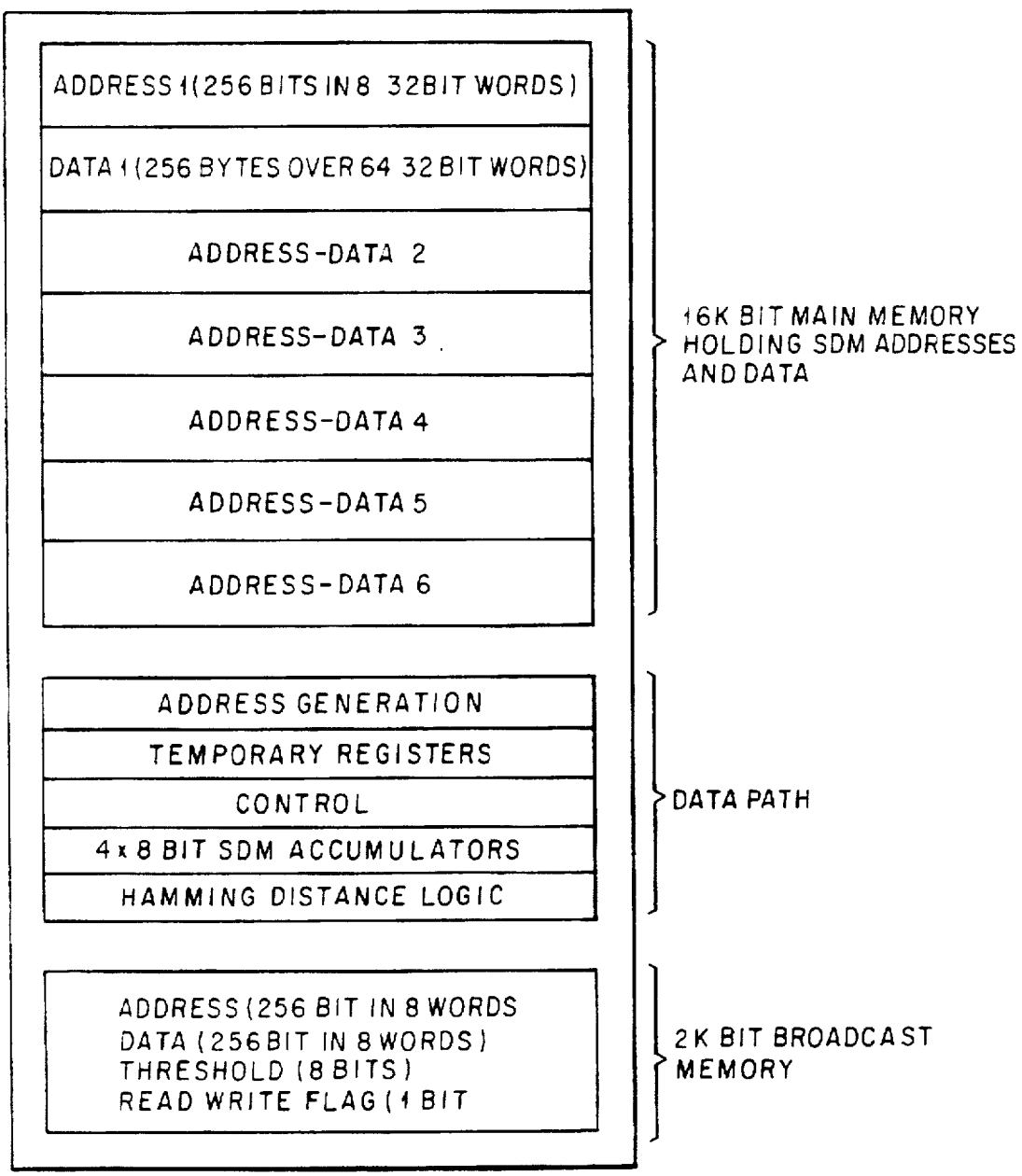

Each memory/processor chip consists of a 16K memory seen internally as a 512×32, a 2K broadcast memory seen internally as a 64×32, and a datapath that has full 32 bit access to both memories. The memory is logically divided into six address data pairs and a region in which to accumulate the data on a read. FIG. 9 shows the logical structure of the memories.

The 16K memory is used to store the SDM address and data, the broadcast memory is used to store the data needed for each SDM read or write, and the datapath does the SDM computation. The datapath has special logic to compute the hamming distance of a 32 bit word in one clock cycle, and four SDM style accumulators to operate, in parallel, on the four data "bits" that are stored in each word. The datapath is heavily pipelined for maximum speed.

Techniques for the initialization of the fixed SDM addresses on each chip, and the broadcasting of the address and data information needed for an SDM read or write are described below. The present description will concentate on the operations inside the SDM memory/processor chip.

Upon receiving the broadcast of the read or write information, the datapath proceeds to cycle through each of the SDM addresses, one word at a time, calculating the Hamming distance to the target SDM address that it is cycling out of the broadcast memory, and accumulating the partial Hamming distance into a total Hamming distance.

The total Hamming distance is compared with the threshold to determine if the address is active. If not active, the datapath goes onto the next SDM address, if active, the data update—on a write, or data accumulate—on a read happen. On data update, the SDM "bits" are incremented on write of a 1, and decremented on write of a 0. On a data accumulate, the data is read from the main memory the result so far is read from the main memory, and their addition is written back into the main memory.

The datapath and accumulation region are also used in the hierarchical boardwise data accumulation on an SDM read that is described below, where data for bit x−1 is cycled in through the hierarchy input pins and accumulated, whilst data for bit x is cycled out of hierarchy out pins.

However extensions to the standard SDM algorithm are continually sought such as tagging, and constant number of responders. Hence it may be desirable to make the datapath a processor, with SDM, support and with the program stored in the broadcast memory.

Each board consists of 512 memory/processor chips, each chip contains six, 256 bit wide SDM addresses and associated data. Also on each board are off the shelf parts to do the Nubus access, signal driving, and predetermined memory location detection. The 512 memory/processor chips are organized in three ways, as:

1. a regular memory of 256K×32bits
2. an binary tree 8 levels deep
3. a broadcast memory The regular memory supports non-SDM use, and SDM initialization, the binary tree supports boardwise accumulation of data during SDM read, the broadcast memory (all chips getting memory writes simultaneously) supports writing of the SDM addresses, data, and threshold.

Figure 11:
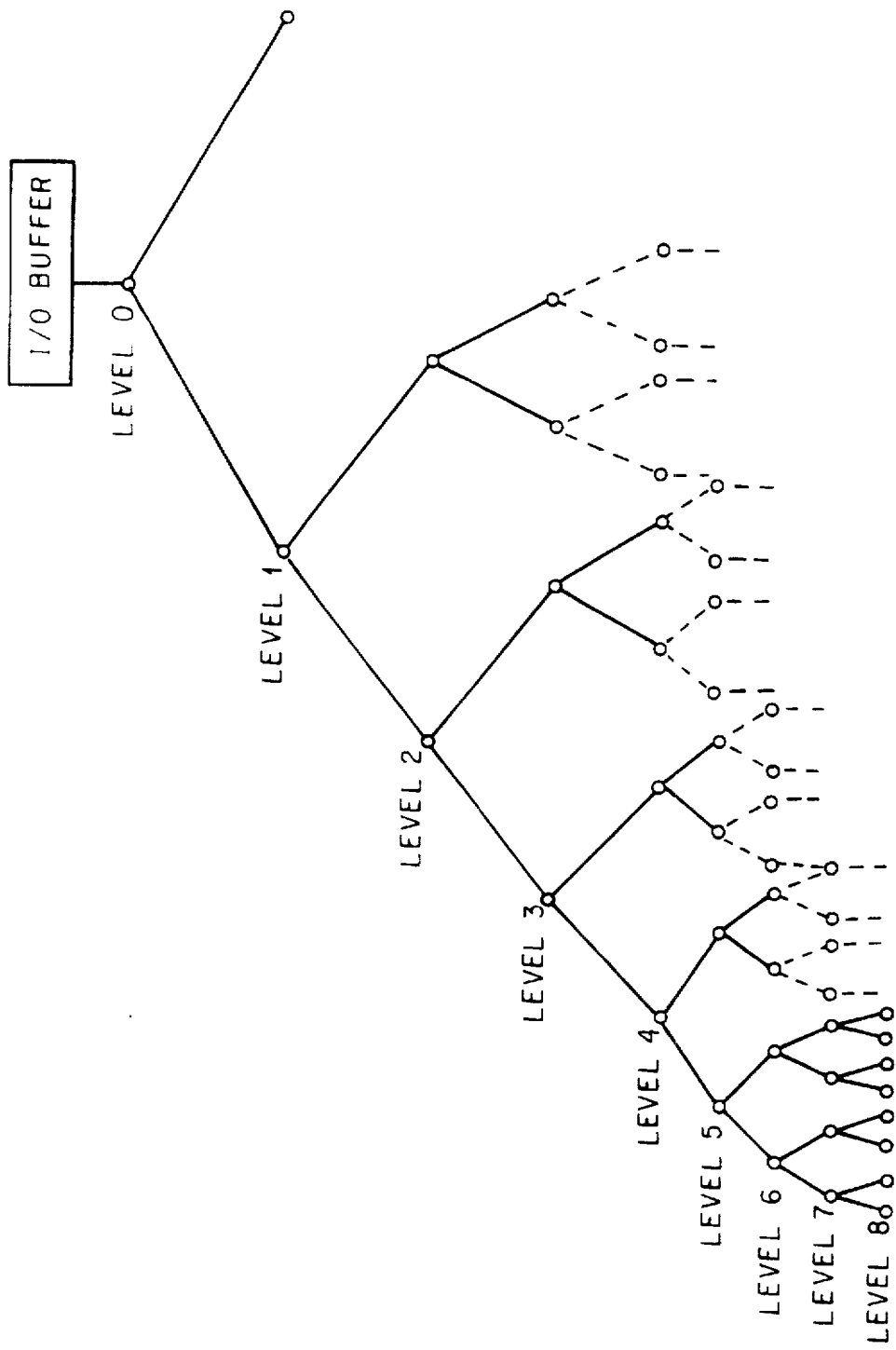
FIG. 11 illustrates the hierarchy in the sixth preferred embodiment system.

On a SDM read or write, address and data are written to a predetermined memory location. Special logic detects this and enables all memory/processor chips for write. The SDM address and data and threshold and read/write flag are then written to all memory/processor chips. On a SDM read each chip does data updates locally, no interchip communication is required, this can be accomplished in 3.6 μsec. On SDM read each chip accumulates data from its active SDM locations locally, then a boardwise accumulation of the data that has been accumulated in each of the 512 chips takes place. The chips are connected in a hierarchy to facilitate this operation. The hierarchy is 8 deep and branching factor 2, with the extra 512th chip added specially in at the top (FIG. 11).

Figure 12:
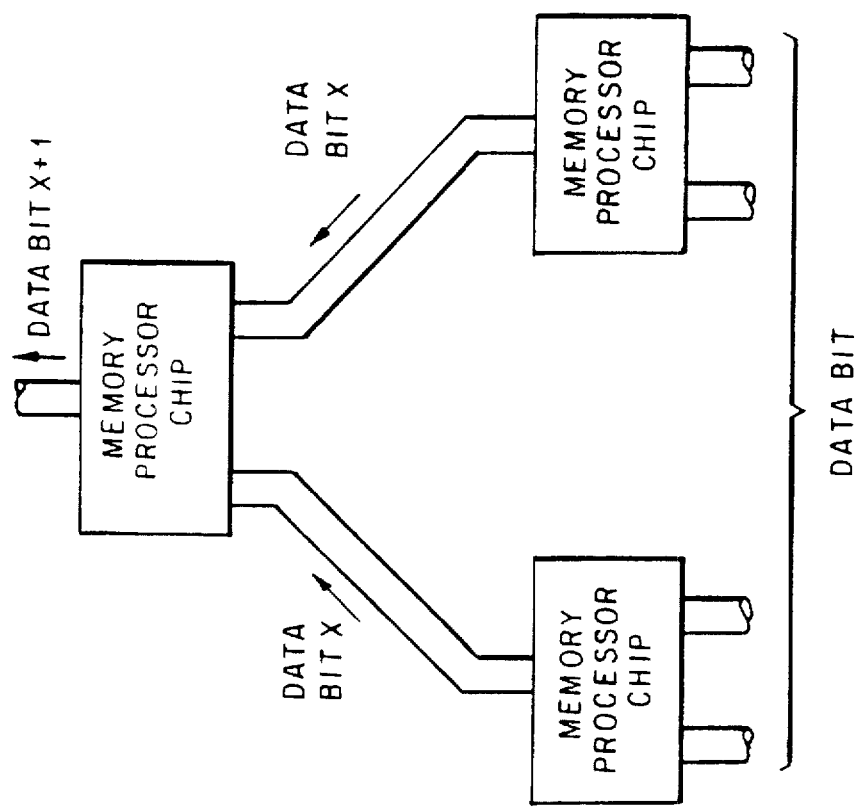
FIG. 12 shows data passage in the hierarchy of the sixth preferred embodiment system.

The hierarchy enables all the level 8 chips can be passing data to their level 7 parents together. Six extra pins on each memory/processor memory chip (see FIG. 12) are provided for the hierarchical connection: two up (HO0 and HO1), and four down (HL0 and HL1 for left child and HR0 and HR1 for right child). The passage of data up the hierarchy is also pipelined 8 deep: whilst byte x is passing from level 2 to level 1, byte x+1 can be passing from level 3 to level 2 and so on. With these features the data transmission for the whole board takes 84 μsec.

At the top of the hierarchy off-the-shelf logic is used to buffer the data into 64 32-bit words. This buffer logic has 32-bit output to the Nubus backplane. With the data 32 bits wide, and buffered, full use of the Nubus burst transfer mechanism can be used to transmit the SDM read data to the CPU in 6.8 μpsec.

The memory/processor chips, also have 23 pins to allow them to be connected as a 2K×8 memory (FIG. 13). Using these connections the 512 memory/processor chips are connected in a regular memory structure and the board appears to the CPU as a 256K×32bit memory board. The regular memory structure facilitates the initial writing of the SDM addresses, allows the board to be used as a regular memory board, and gives observability and controlabiliy for system test and debug.

Figure 14B:
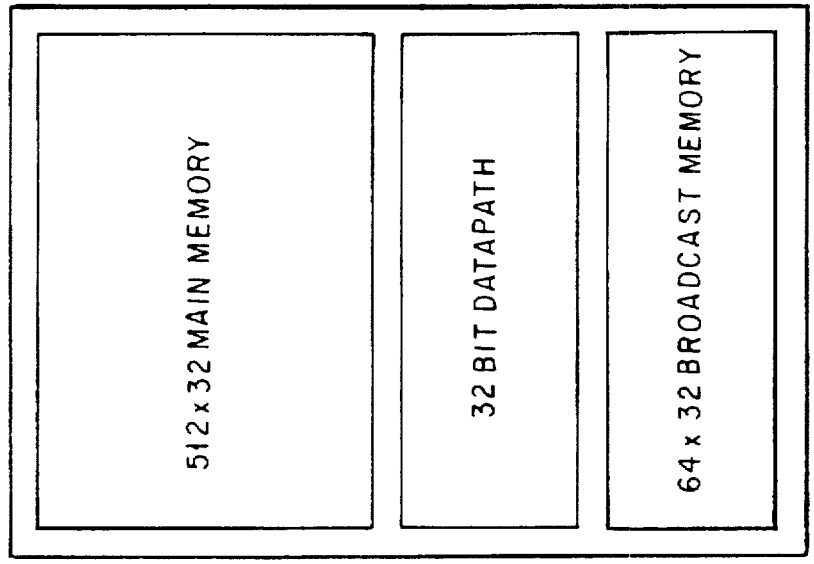
FIG. 14 illustrates the internal versus external block structure of the sixth preferred embodiment memory.
Figure 14A:
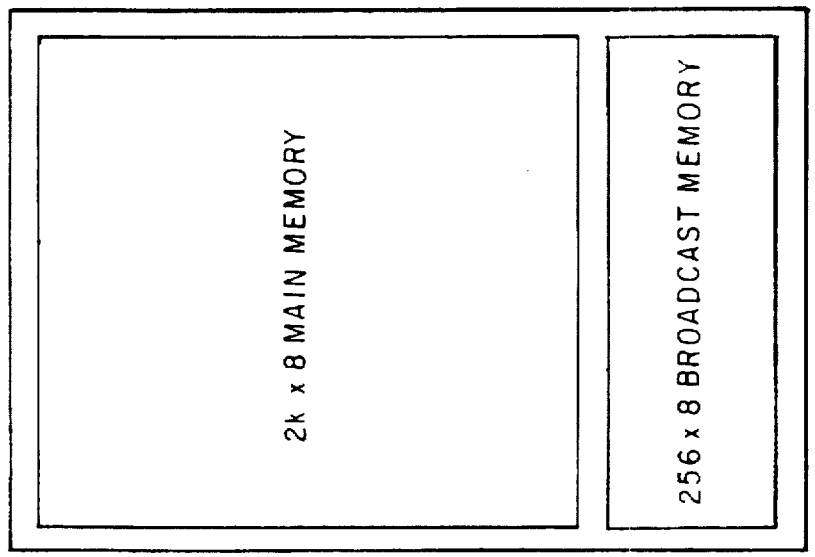

The final chip/board architectural feature is the broadcast mode. Each chip has an additional 2K×8 broadcast memory that is used to receive data that will be broadcast to all chips at once. Off the-shelf-parts are used to detect a memory write to a special location. When this happens the broadcast mode pin on each memory/processor chip goes high. This selects all chips, and memory writes can happen into the 2K×8 broadcast memories. The SDM address, data and active radius and read/write flag are broadcast to each chip. FIG. 14 shows the block structure of the memory/processor chips.

The SDM machine has the following good architectural features:

on chip memory access speeds (½ off chip)
on chip memory bandwidth (32 bits×8)
simple on chip processing (no interrupts, no virtual memory)
connected as regular memory
connected in hierarchy
connected as broadcast memory
plug-in ability Thus it can be considered for other applications. Speech recognition (dynamic time warping and hidden markov model approaches) and matrix multiplication are applications that map well to this architecture.

This system design can be grown in a number of ways
-256K SRAM chips instead of 16K SRAM s to give 16 times the capacity
-4meg DRAM chips instead of 16K SRAM s to give 256 times the capacity
-Add more boards for more capacity, perhaps hierarchically connected
-a Macintosh sized board, ⅓ capacity, same speed, same nubus The SMD machine should solve the application proposed here on a single board. The main features of the machine are its speed, its ease of use, and the possibilities for much larger SDM machines of the same architecture.

MODIFICATIONS AND ADVANTAGES

Various modifications of the preferred embodiment devices and methods may be made while retaining the features such as Broadcast RAM or low level on-chip logic.

For example, the dimensions and shapes and sizes of the RAMs, logic, busses, and so forth could be varied. The Data RAM could be ROM or PROM for applications where the data is always the same; or the Data RAM could be EPROM or EEPROM for infrequently changing data. This would allow the system to be nonvolatile. Also, a load-store processor could be integrated into the smart memories with the Broadcast RAM regarded as the program memory and the Data RAM as the data memory so a Harvard architecture results. Further, computation on data-intensive kernels would be downloaded to the program memory.

Larger memory array chips will allow a wider internal data path thus eliminating a proportionate number of internal reads and increasing the number of parallel processing elements per chip.

In order to minimize the required board area of multiple chip systems, there will be a drive toward high density multi-chip modules that will begin with chips of simple pin out requirements. Smart memory based MPP systems will greatly benefit from this.

What is claimed is:

1. An integrated circuit memory chip having logic embedded thereon, comprising:

a data memory, said data memory directly coupled through an input/output multiplexer to a data bus terminal;

a chip select terminal coupled to said data memory;

a broadcast memory, said broadcast memory directly coupled through said input/output multiplexer to said data bus terminal, and said broadcast memory not coupled to said chip select terminal, wherein said broadcast memory responds to a broadcast write by an external CPU;

an address bus directly coupled to both said data memory and said broadcast memory; and a datapath coupled to both said data memory and said broadcast memory, said data path including circuitry for computation with data from said data memory, and a detector for receiving an external signal for initiating and terminating said computation.

2. The integrated circuit of claim 1 wherein said broadcast memory is addressable by an external source.

3. The integrated circuit of claim 1 wherein at least a portion of said data memory has a common address with said broadcast memory.

4. The memory chip of claim 1, wherein said data memory comprises an SRAM array and said broadcast memory comprises an SRAM array.

5. A computer system, comprising:

a central processing unit;

a memory system, said memory system including a plurality of memory integrated circuits (ICs), each of said memory ICs including:

a data memory, said data memory coupled to a data bus terminal;

a chip select terminal coupled to said data memory for receiving a signal from said central processing unit;

a broadcast memory, said broadcast memory coupled to said data bus terminal, and said broadcast memory not coupled to said chip select terminal, wherein the broadcast memories from more than one of said memory ICs respond simultaneously to a single broadcast write from said central processing unit;

an address bus terminal directly coupled to said data memory and broadcast memory;

a datapath coupled to both said data memory and said broadcast memory; and input/output circuitry for connecting said central processing unit and said memory system.

6. The system of claim 5, further comprising:

a detector in each of said memories and coupled to said address bus terminal and said broadcast memory.

7. The computer system of claim 5, wherein (a) said plurality of memories is hierarchically arranged.

8. The computer system of claim 5, wherein (a) each memory of said plurality includes sparse distributed memory address and data circuitry.

9. The computer system of claim 5 wherein said broadcast memory is addressable by an external source.

10. The computer system of claim 5 wherein at least a portion of said data memory has a common address with said broadcast memory.

11. The computer system of claim 5 wherein said data path of each memory includes circuitry for computation using data from its associated memory and each memory further includes a detector for receiving a signal from said central processing unit for initiating and terminating said computation.

12. The computer system of claim 5, wherein said data memory comprises an SRAM array and said broadcast memory comprises an SRAM array.

* * * * *